United States Patent
Hawkins et al.

(10) Patent No.: US 6,247,000 B1
(45) Date of Patent: Jun. 12, 2001

(54) METHOD AND SYSTEM FOR CONFIRMATION AND SETTLEMENT FOR FINANCIAL TRANSACTIONS MATCHING

(75) Inventors: John G. Hawkins, Westfield; Dave M. Jacobs, Wayne; Rick Fitzpatrick, Rockaway, all of NJ (US)

(73) Assignee: Crossmar, Inc.

( * ) Notice: Subject to any disclaimer, the term of this patent is extended or adjusted under 35 U.S.C. 154(b) by 0 days.

(21) Appl. No.: 09/097,695

(22) Filed: Jun. 16, 1998

Related U.S. Application Data

(63) Continuation-in-part of application No. 08/700,836, filed on Aug. 21, 1996, now Pat. No. 6,029,146.
(60) Provisional application No. 60/049,851, filed on Jun. 17, 1997.

(51) Int. Cl.[7] .................................................. G06F 17/60
(52) U.S. Cl. ............................................................... 705/37
(58) Field of Search ................................. 705/37, 35, 39, 705/36, 40

(56) References Cited

U.S. PATENT DOCUMENTS

| | | | |
|---|---|---|---|
| 4,346,442 | * | 8/1982 | Musmanno .............................. 705/36 |
| 4,376,978 | * | 3/1983 | Musmanno .............................. 705/36 |
| 4,571,463 | * | 2/1986 | Shefler ................................... 379/355 |
| 4,674,044 | * | 6/1987 | Kalmus et al. ......................... 705/37 |
| 4,694,397 | * | 9/1987 | Grant et al. ............................. 705/35 |
| 4,774,663 | * | 9/1988 | Musmanno et al. ................... 705/37 |
| 4,823,265 | * | 4/1989 | Nelson ................................... 705/35 |
| 4,903,201 | * | 2/1990 | Wagner ................................. 705/37 |
| 4,949,248 | * | 8/1990 | Caro ...................................... 705/37 |
| 4,980,826 | * | 12/1990 | Wagner ................................. 705/37 |
| 5,038,284 | * | 8/1991 | Kramer .................................. 705/37 |
| 5,077,665 | * | 12/1991 | Silverman et al. .................... 705/37 |

(List continued on next page.)

FOREIGN PATENT DOCUMENTS

0434224 A2 * 6/1991 (EP) .............................. G06F/15/21

OTHER PUBLICATIONS

Jones, David, "New Year Initiatives on Securities Automation", Financial Technology International Bulletin, vol. 10, No. 5, p. 1–3, Jan. 1993.*
The Depository Trust Company, "Institutional Delivery (ID) System Functional Design Paper for Enhanced, Interactive Capabilities", Mar. 31, 1993.*
Essinger, James, "Special Report—Electronic Trade Confirmation: A Review of Progress Made to Date", Financial Technology Insight Sep. 1993.*
The Depository Trust Company, "Institutional Delivery System User Manual", 1994.*
"Fund Managers Signing Up With Swift Want Straight-–Through–Processing", Flnancial Technology International Bulletin, vol. 12, No. 2, p. 8–9, Oct. 1994.*
"ACT and London Stock Exchange Build Gateway", Financial Technology Insight, Oct. 1994, Dialog File 636:Newsletter DB.*

(List continued on next page.)

*Primary Examiner*—James P. Trammell
*Assistant Examiner*—John W. Hayes
(74) *Attorney, Agent, or Firm*—George T. Marcou; Kilpatrick Stockton LLP

(57) ABSTRACT

The present invention, an embodiment of which is known as Crossmar Matching Service (CMS) provides a method and system for matching order routing of securities and other instrument types, and for matching other transaction information on a post-execution basis, such as during the confirmation and settlement phase. The functions of the present invention occur on the post-execution side of the value chain and include matching the financials, matching the delivery instructions, and confirming those deliveries and instructions. The method and system of the present invention thus further provide a confirmation and settlement system for these functions.

35 Claims, 38 Drawing Sheets

U.S. PATENT DOCUMENTS

| | | | |
|---|---|---|---|
| 5,101,353 | * | 3/1992 | Lupien et al. ............................ 705/37 |
| 5,136,501 | * | 8/1992 | Silverman et al. ..................... 705/37 |
| 5,220,501 | * | 6/1993 | Lawlor et al. .......................... 705/40 |
| 5,262,942 | * | 11/1993 | Earle ....................................... 705/37 |
| 5,285,383 | * | 2/1994 | Lindsey et al. ......................... 705/37 |
| 5,424,938 | * | 6/1995 | Wagner et al. ......................... 705/42 |
| 5,497,317 | * | 3/1996 | Hawkins et al. ....................... 705/37 |
| 5,517,406 | * | 5/1996 | Harris et al. ............................ 705/37 |
| 5,727,165 | * | 3/1998 | Ordish et al. ........................... 705/37 |
| 5,787,402 | * | 7/1998 | Potter et al. ............................ 705/37 |
| 5,832,462 | * | 11/1998 | Midorikawa et al. ................. 705/35 |
| 5,845,266 | * | 12/1998 | Lupien et al. ........................... 705/37 |
| 5,924,082 | * | 7/1999 | Silverman et al. ..................... 705/37 |
| 5,950,176 | * | 9/1999 | Keiser et al. ........................... 705/37 |
| 5,963,923 | * | 10/1999 | Garber .................................... 705/37 |

OTHER PUBLICATIONS

"London Stock Exchange: New Sequal Gateway Goes Live", M2 Presswire, Mar. 8, 1996, Dialog File 636:Newsletter DB.*

Coffey, Brendan, "Sequal Gets Mixed Reviews", Wall Street & Technology, vol. 14, No. 11, p. 44–48, Nov. 1996.*

International Search Report dated Oct. 19, 1998.

Preliminary Search Report date Jan. 18, 2000, published by the PCT International Preliminary Examining Authority.

Forefront, Global Custodian Magazine, Winter 1995.

* cited by examiner

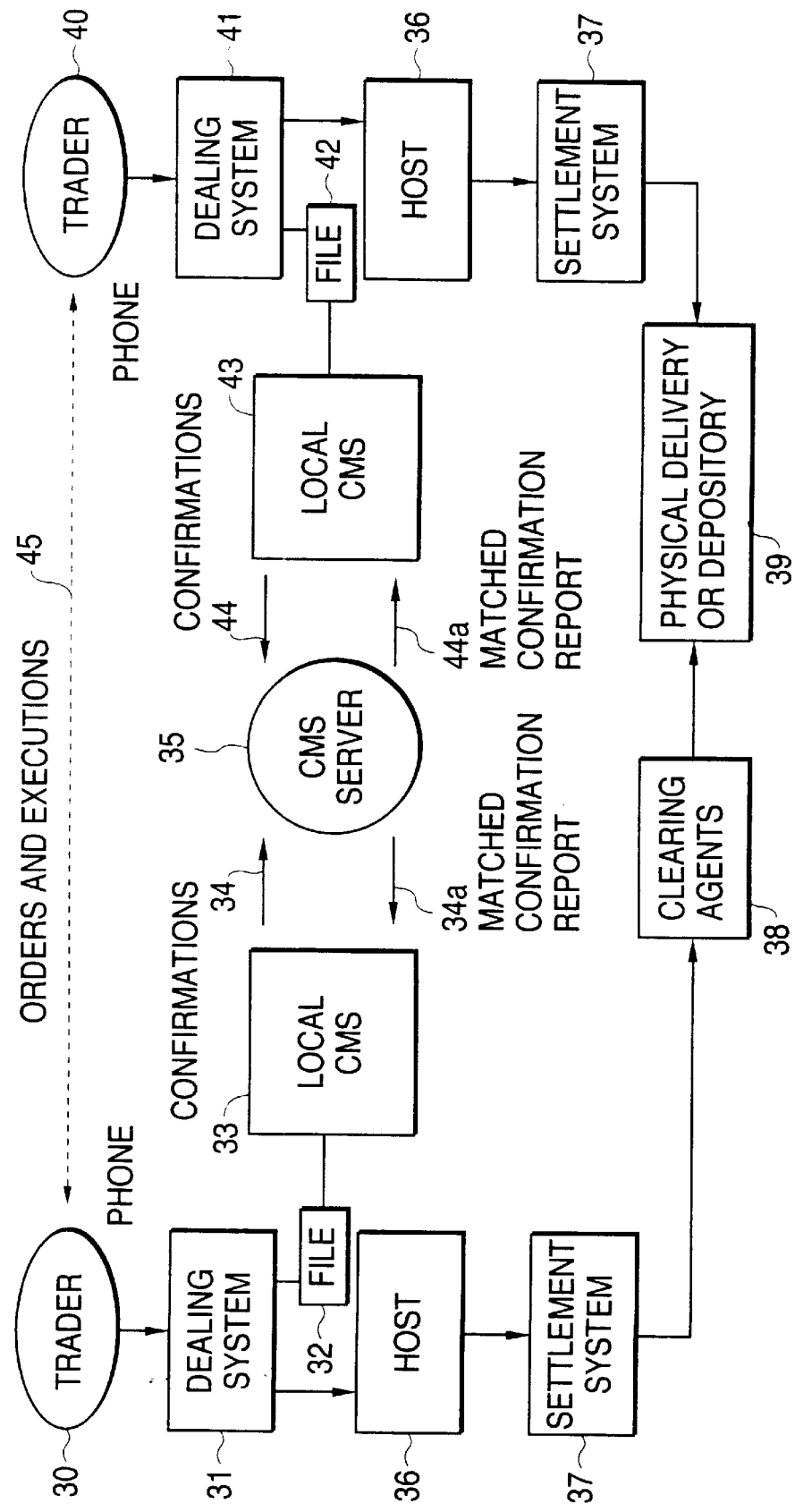

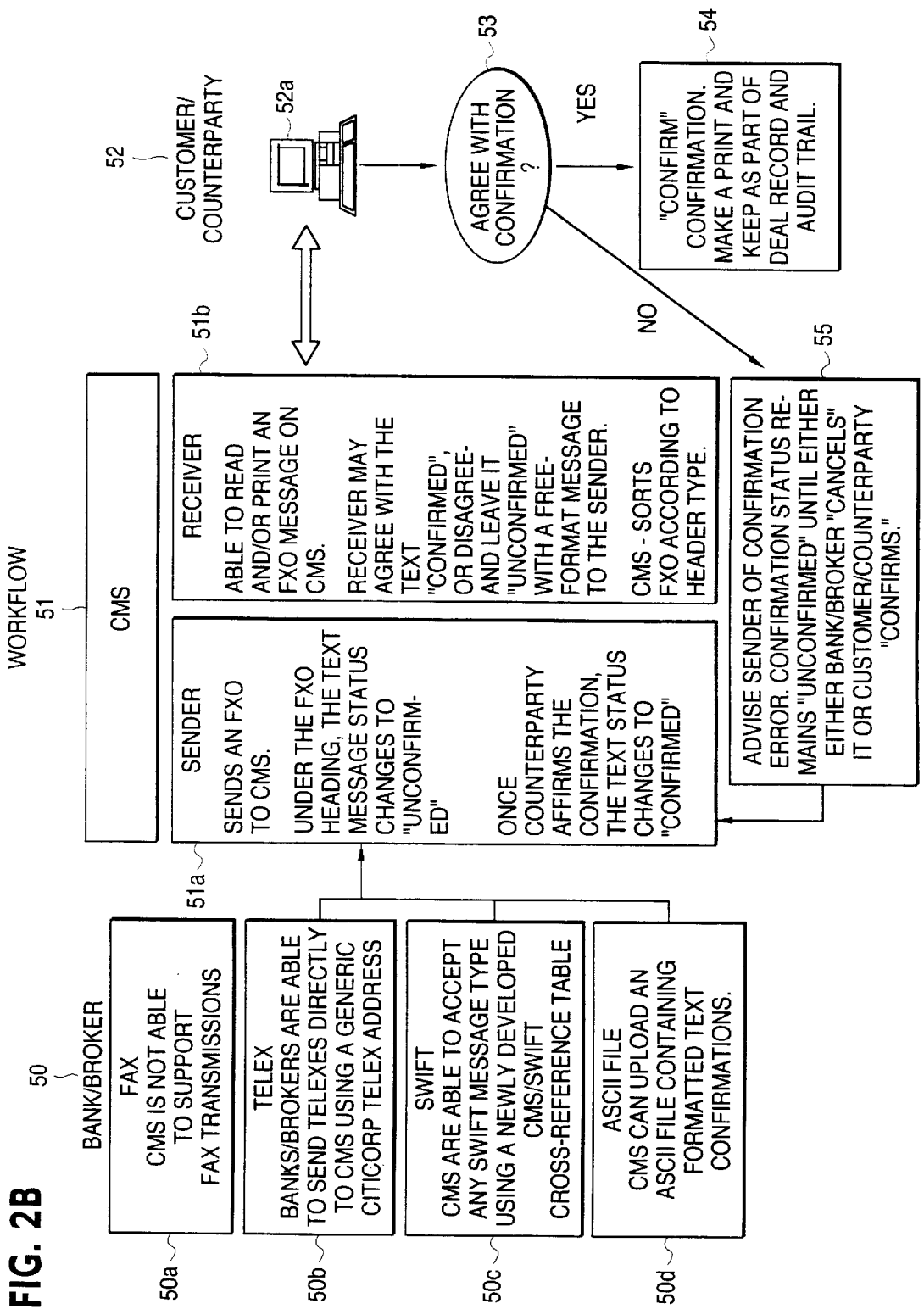

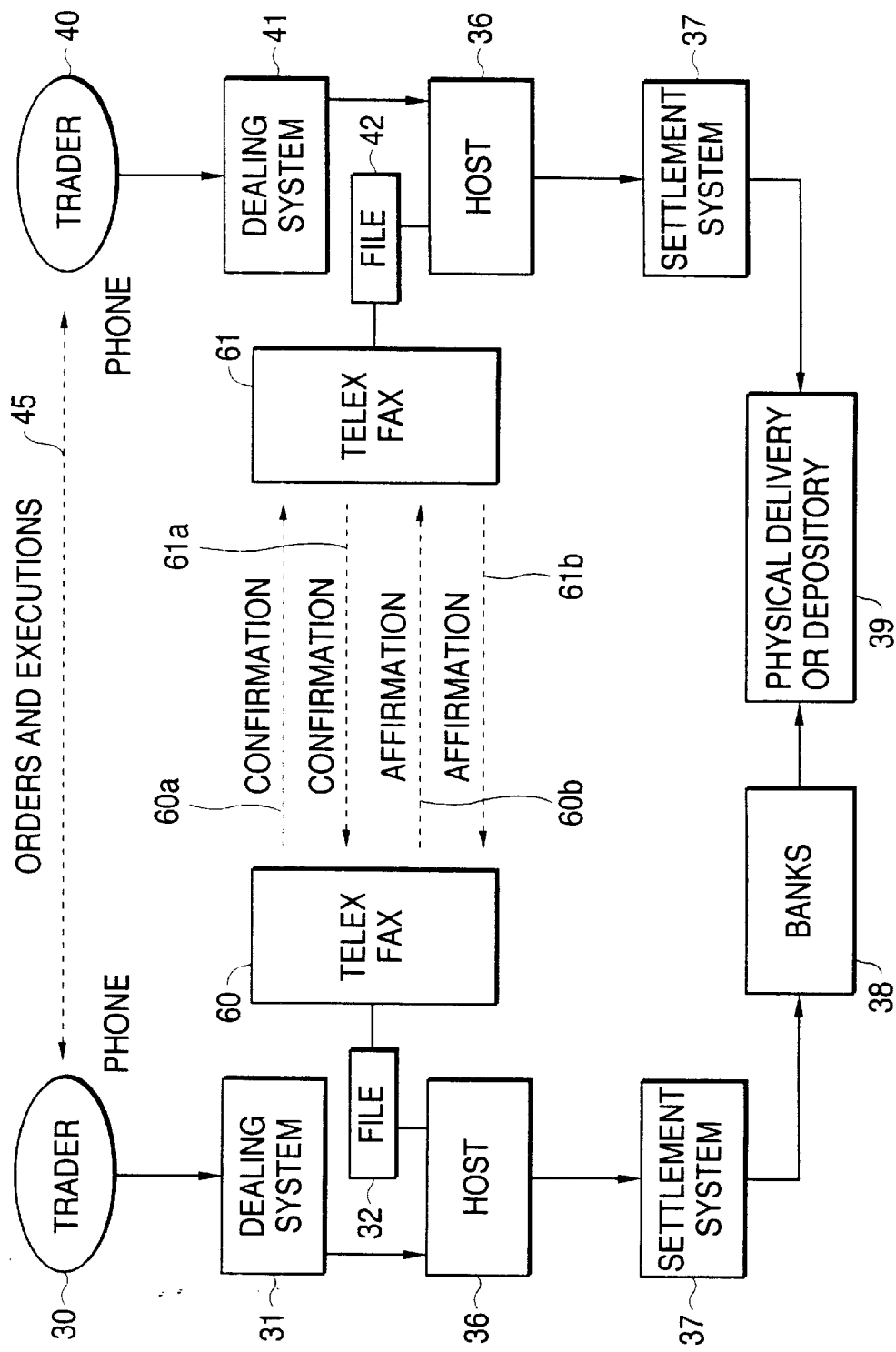

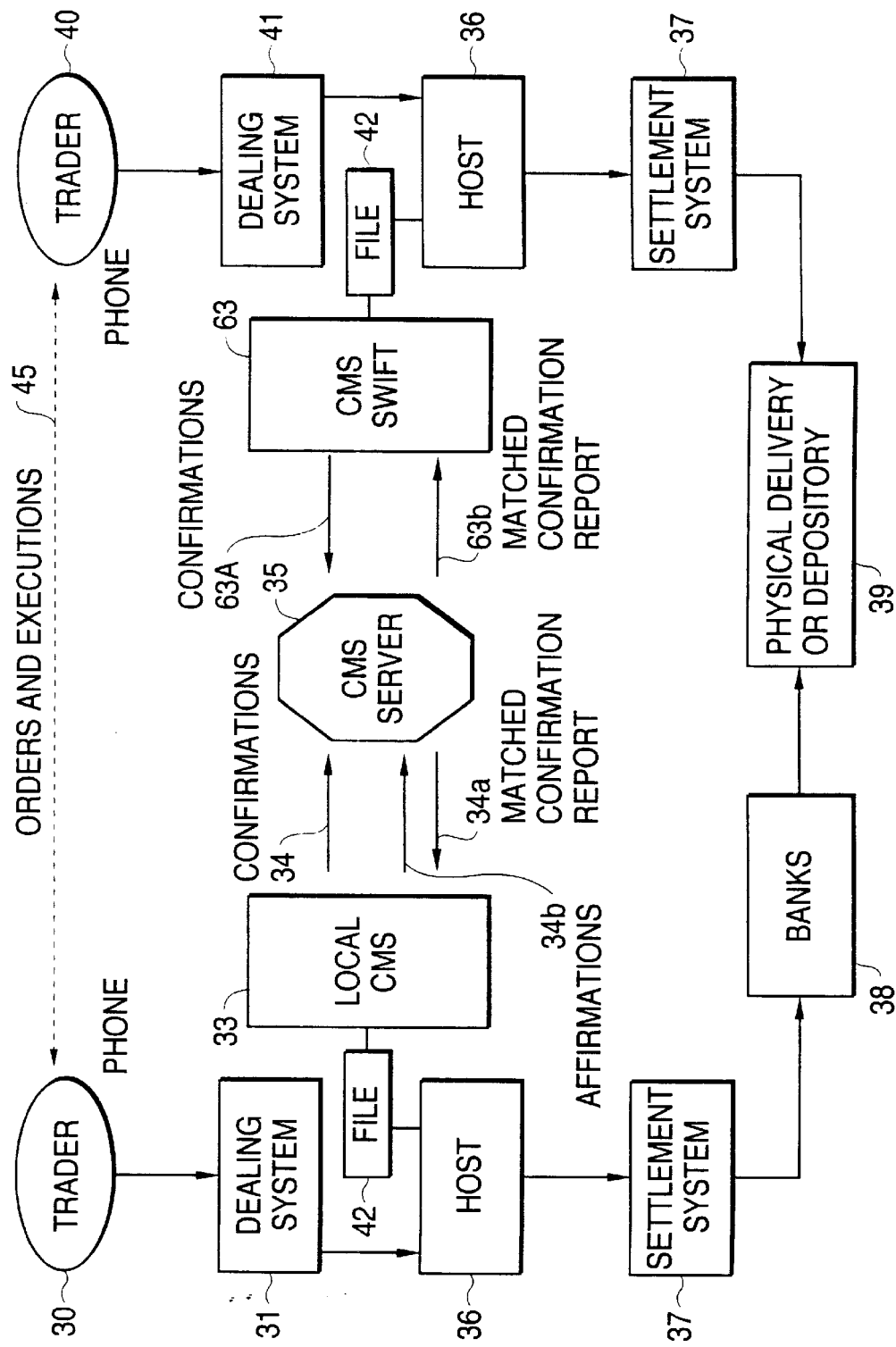

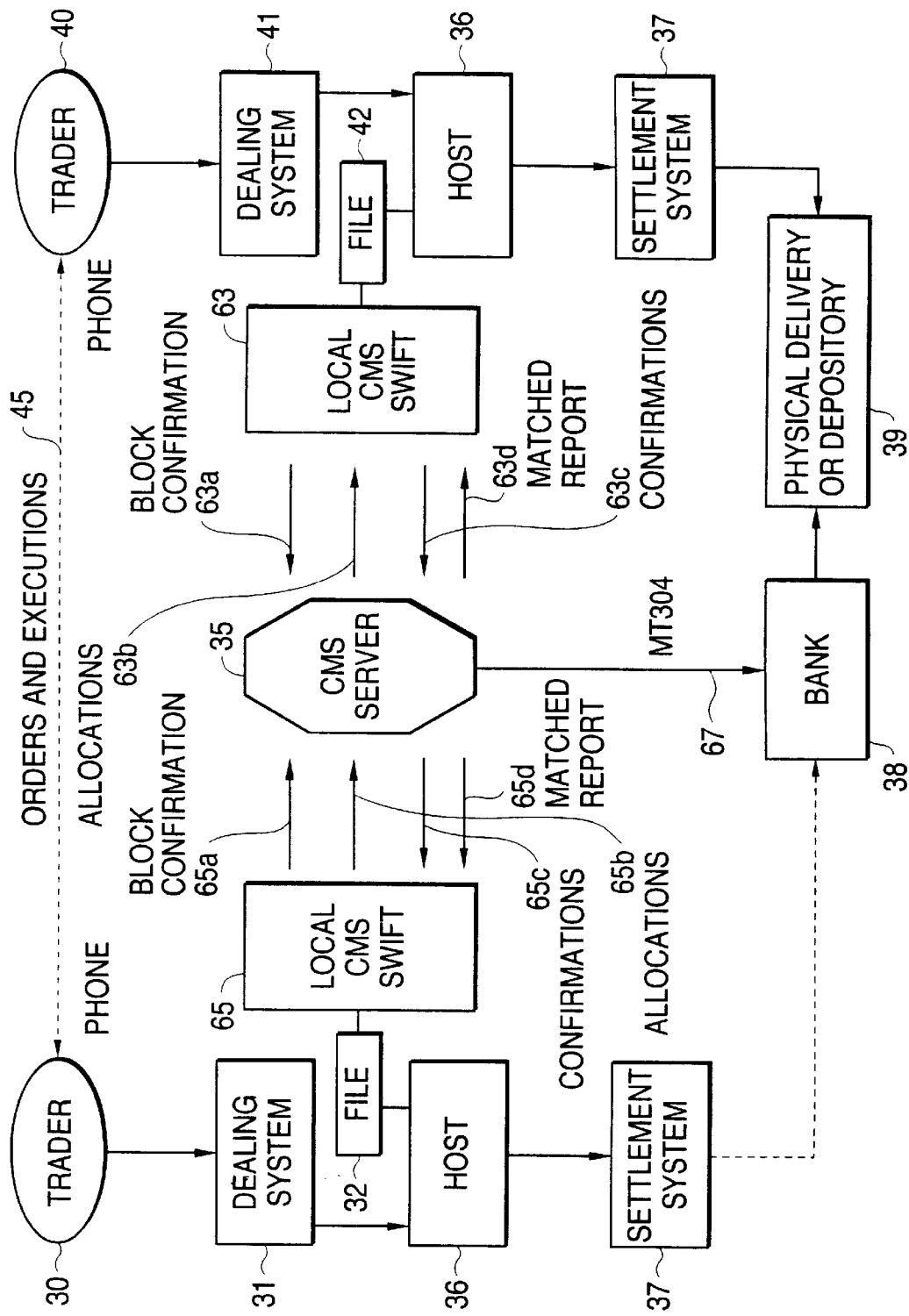

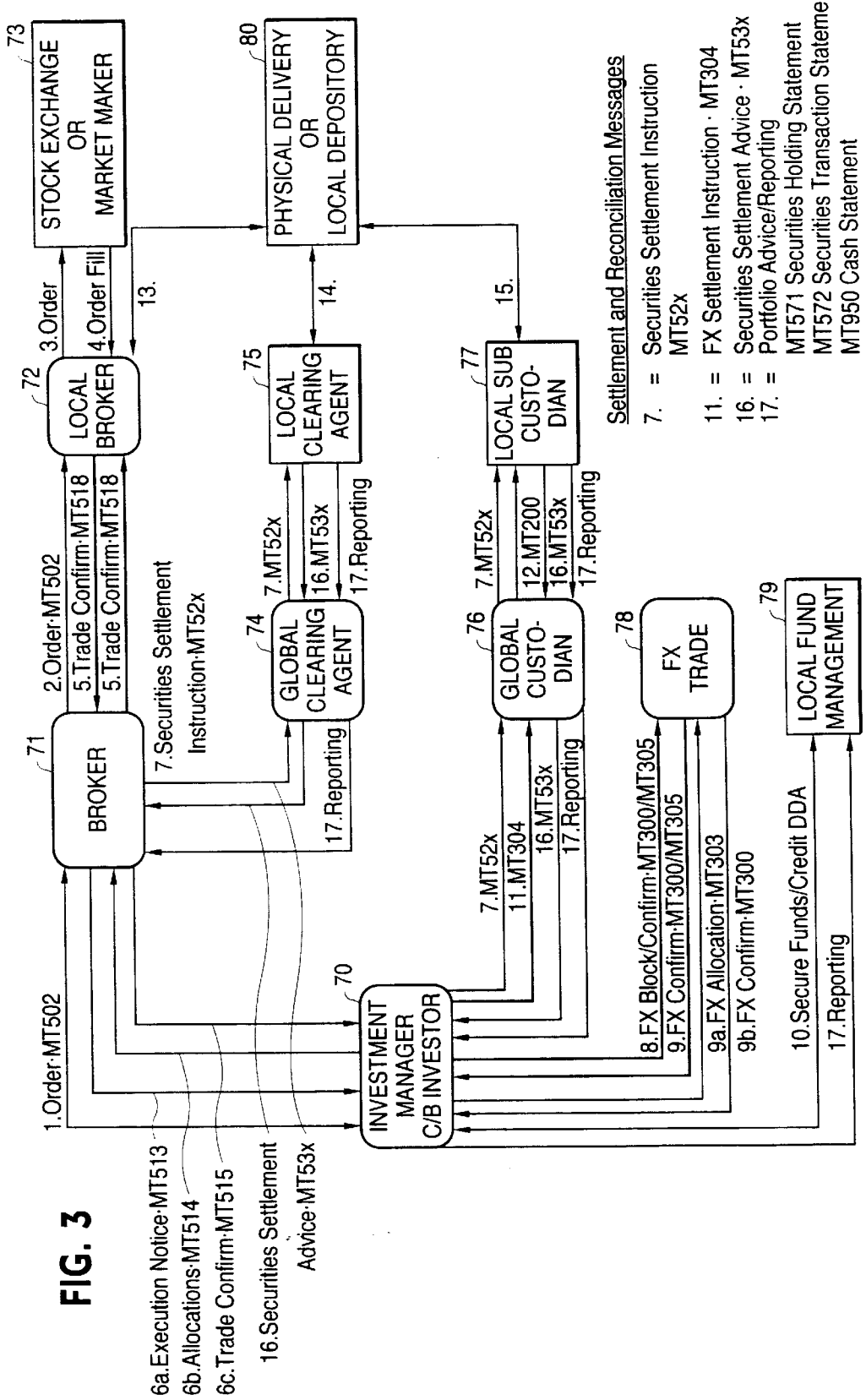

FIG. 14

| Trade Summary | | | | Our Deals (6) | | | | | | |
|---|---|---|---|---|---|---|---|---|---|---|
| Our Entity | Counterparty | Entity | Status | Fund | B/S | C/P | Style | Strike Price | Currency | Currency 2 |
| xxx | xxxxUS33 | xxx | Matched | | BUY | PUT | E | 0.5897 | USD100000 | DEM169577.7 |
| xxx | xxxxUS33 | xxx | Matched | | SELL | CAL | E | .998 | USD4000 | DEM3900 |
| xxx | xxxxUS33 | xxx | UnMatch | | BUY | PUT | E | 1.55 | GBP3000 | USD5500 |
| xxx | xxxxUS33 | xxx | UnMatch | | BUY | PUT | E | 0.5897 | USD1000 | DEM590 |
| xxx | xxxxUS33 | xxx | UnMatch | | BUY | PUT | E | 1.2 | USD7000 | DEM80000 |
| xxx | xxxxUS33 | xxx | UnMatch | | SELL | PUT | E | 0.5897 | USD100000 | HKD169577.7 |

| | | | | Their Deals (4) | | | | | | |
|---|---|---|---|---|---|---|---|---|---|---|
| Our Entity | Counterparty | Entity | Status | Fund | B/S | C/P | Style | Strike Price | Currency | Currency 2 |
| xxx | xxxxUS33 | xxx | Matched | | SEL | PUT | E | 0.5897 | USD100000 | DEM169577.7 |
| xxx | xxxxUS33 | xxx | Matched | | BUY | CAL | E | .998 | USD4000 | DEM3900 |
| xxx | xxxxUS33 | xxx | UnMatche | | SEL | PUT | E | 1.2 | GBP3000 | DEM80000 |
| xxx | xxxxUS33 | xxx | UnMatche | | SEL | PUT | E | 0.5897 | USD1000 | DEM5900 |

Suggest    Differences    4    Refresh    Exit

Settlement Message Details

Ours / Theirs

Serial Number / Clear

Quantity:
Instrument:
ISIN:
Settlement Amt.:
Sett. Date:
Trade Date:
Place:
Safe-keeping Account:
Ref. No.:

Additional Fees
Taxes:
Charges:
Commission:
Interest:
Book Value:

Account(s) for Charges:
Receiver of Cash:
Declaration Details:

Save | Clear | Cancel

Primary 500a | Additional Fees 500b | Misc. Instructions 500c | Confirm Details 500d

Settlement Message Details

Ours | Theirs

- Quantity:
- Instrument:
- ISIN: ISIN
- Settlement Amt.:
- Trade Date:
- Sett. Date:
- Place:
- Safe keeping Account:
- Ref. No.:

Save | Clear | Cancel

Serial Number | Clear

- Registration Details:
- Beneficiary of Securities:
- Beneficiary of Money:
- Next Coupon:
- Certificate Numbers:

Primary | Additional Fees | Misc. Instructions | Confirm Details
500a — 500b — 500c — 500d

| SETTLEMENT STATUS | CONFIRM EXISTS STATUS = UNMATCHED | CONFIRM EXISTS STATUS = MATCHED (VIA A MT518) | CONFIRM EXISTS STATUS = CANCEL | CONFIRM DOES NOT EXIST |
|---|---|---|---|---|
| NEW (MT52X) | IF TRANSACTION MATCHES: SET CONFIRM TO PREMATCHED<br><br>SET FIELD 72 ON SETTLEMENT TO: /MATCHED /CROSSMAR (CODE 93)<br><br>IF TRANSACTION DOES NOT MATCH: LEAVE CONFIRM AS UNMATCHED<br><br>SET FIELD 72 ON SETTLEMENT TO: /CUNMATCH/ AND SUPPLY RELEVANT CODES | IF TRANSACTION MATCHES: CHANGE CONFIRM TO PREMATCHED<br><br>SET FIELD 72 ON SETTLEMENT TO: SET FIELD 72 ON SETTLEMENT TO: /MATCHED/CROSS-MAR (CODE 93)<br><br>IF TRANSACTION DOES NOT MATCH: LEAVE CONFIRM AS MATCHED<br><br>SET FIELD 72 ON SETTLEMENT TO: /CUNMATCH/ AND SUPPLY RELEVANT CODES | IF TRANSACTION MATCHES: LEAVE CONFIRM AS CANCEL<br><br>SET FIELD 72 ON SETTLEMENT TO: ATTEMPTED PRE-MATCH FAILED (CODE 92)<br><br>IF TRANSACTION DOES NOT MATCH: LEAVE CONFIRM AS CANCEL<br><br>SET FIELD 72 ON SETTLEMENT TO: ATTEMPTED PRE-MATCH FAILED (CODE 92) | IF TRANSACTION MATCHES: *CASE DOES NOT EXIST*<br><br><br><br>IF TRANSACTION DOES NOT MATCH:<br><br>SET FIELD 72 ON SETTLEMENT TO: ATTEMPTED PRE-MATCH FAILED (CODE 95) |
| CANCEL (MT592) | CANNOT MATCH MT592 WITH UNMATCHED MT518 | IF TRANSACTION MATCHES: CHANGE CONFIRM TO UNMATCHED<br><br>DO NOT CHANGE MT592<br><br>IF TRANSACTION DOES NOT MATCH: LEAVE CONFIRM AS MATCHED<br><br>DO NOT CHANGE MT592 | CANNOT MATCH MT592 WITH A CANCELED MT518 | CANNOT MATCH MT592 WITH A NON EXISTENT MT518 |
| AMEND | SETTLEMENT INSTRUCTIONS CANNOT BE SENT WITH AMEND STATUS | | | |

FIG. 28D

| CONFIRM MESSAGE STATUS | SETTLEMENT EXISTS STATUS = UNMATCHED | SETTLEMENT EXISTS STATUS = CANCEL | SETTLEMENT EXISTS STATUS = MATCHED | SETTLEMENT DOES NOT EXIST |
|---|---|---|---|---|
| NEW | IF TRANSACTION MATCHES: SET CONFIRM TO PREMATCHED<br><br>SET FIELD 72 ON SETTLEMENT TO: /MATCHED /CROSSMAR (CODE 93)<br><br>IF TRANSACTION DOES NOT MATCH: LEAVE CONFIRM AS UNMATCHED<br><br>LEAVE SETTLEMENT AS UNMATCHED | CANNOT MATCH NEW CONFIRMS TO CANCELS (MT592) | CANNOT MATCH A NEW CONFIRM WITH A MATCHED SETTLEMENT | *CASE DOES NOT EXIST* |
| AMEND | SAME AS NEW | SAME AS NEW | CANNOT AMEND A MATCHED A CONFIRM WITH A MATCHED SETTLEMENT | SAME AS NEW |
| CANCEL | IF CONFIRM EXISTS, SET CONFIRM TO CANCEL<br><br>DO NOT ATTEMPT TO PREMATCH WITH SETTLEMENT | IF CONFIRM EXISTS, SET CONFIRM TO CANCEL<br><br>CANNOT MATCH CANCEL CONFIRMS TO CANCELS (MT592) | IF CONFIRM EXISTS, SET CONFIRM TO CANCEL<br><br>SET SETTLEMENT TO UNMATCHED | IF CONFIRM EXISTS, SET CONFIRM TO CANCEL<br><br>*CASE DOES NOT EXIST* |
| MATCHED | CONFIRMS CANNOT BE SENT WITH MATCHED STATUS | | | |

FIG. 29

Settlement Delivery Instructions Manager

Standing Delivery Instructions Summary

| Counter | Counter Party | Security Types | Clearing Agents |
|---|---|---|---|
| GBR | CITIPHMA050 | EQU | APMT Citibank |
| PHI | CITIPHMA050 | EQU | APMT Citibank-Manila |

Settlement Instructions

Submit Button    Remove Button    Clear Button

Submit    Remove    Clear    Exit

Security Type Check Box — 632

Security Type
☒ EQ Equities  ☐ OP Options
☐ FI Fixed Income  ☐ MI Miscellaneous
☐ FU Futures  ☐ All Counter Party: CITIPHMA050 — 638

Country Code: GBR

Clearing Agent: AMPTI  Citibank

Safekeeping Type: ABR
Safekeeping Acct: 1234
Payment Acct: 1234

Account(s) for Charges: acct1

Registration: reg1

550

METHOD AND SYSTEM FOR CONFIRMATION AND SETTLEMENT FOR FINANCIAL TRANSACTIONS MATCHING

CROSS-REFERENCE TO RELATED APPLICATION

This application is a Continuation-in-Part (CIP) of Applicant's application titled METHOD AND APPARATUS FOR TRADING SECURITIES ELECTRONICALLY having U.S. Ser. No. 08/700,836 filed Aug. 21, 1996, now U.S. Pat. No. 6,029,146. This application also claims the benefit of U.S. Provisional Application No. 60/049,851, titled "IMPROVED METHOD AND SYSTEM FOR TRADING", filed Jun. 17, 1997.

Applicant's pending application titled MESSAGE AGENT SERVER having U.S. Ser. No. 60/050,422 filed Jun. 5, 1997, and applicant's application titled METHOD AND SYSTEM FOR PERFORMING AUTOMATED FINANCIAL TRANSACTIONS INVOLVING FOREIGN CURRENCIES having U.S. Ser. No. 08/727,786 filed Oct. 8, 1996, now U.S. Pat. No. 5,787,402 are hereby incorporated by reference.

FIELD OF THE INVENTION

The present invention relates generally to a method and system for automatically matching financial transactions that are electronically traded among various user groups, and in particular to a method and device for automatically matching securities electronically traded among brokers.

BACKGROUND

Sophisticated investors are today uncovering greater long-term returns by investing crossborder. However, as the volume and complexity of global investing increases, delays and errors in processing trades and settlement instructions have accelerated market participants' desire to search for a more automated, efficient approach.

Language barriers, time differences and physical distance combined with short settlement periods increase the risks for all security trading participants. While the current suite of electronic trading products have reduced the risk for the investor and the executing broker by automating the confirmation process, none of the products has provided an efficient method for routing settlement instructions to agent banks. Banks are forced to rely on a variety of manual methods for receiving settlement instructions from their counterparties. These settlement instructions are often received by the bank after the trade is supposed to settle and often contain multiple errors. Banks are required to employ large staffs to chase down settlement instructions, repair messages, and to manually match settlement instructions with executing brokers' instructions prior to settlement taking place.

An example of the way the underlying transactions occur for which matching is typically needed is as follows. Company A, Hong Kong, places an order with Company B, Philippines to purchase 1,000 shares of Securities C. To place the order, the originating broker at Company A telephones and faxes to Company B. Upon receiving the order, an executing broker at Company B executes the trade at the Makati Stock Exchange on Company A's behalf. Typically at the end of the day, Company B notifies Company A, Hong Kong that the trade has been successfully executed. The notification is followed by a fax transmission to the brokers' custodian and clearing agent where the actual fund and security transfer will take place. The entire process could take somewhere between a day and up to several days.

As evident from the above example, this process flows though several stages and tends to be time consuming and error prone. This problem is particularly acute when trading across wide time zone gaps, leaving tight datelines for settling trades and correcting any errors. For institutional money managers, brokers and banks, carrying unconfined trades on their books increases risk. Thus, delays in achieving confirmation are costly to financial institutions reducing the profit margin on these transactions.

Systems exist that permit securities traders to communicate electronically with each other. Each of these systems require the investor's clearing agent to manually pre-match a settlement instruction with the executing broker. Currently, there are no products that can effectively automate the trading confirmation process between brokers.

The Depository Trust Company ("DTC") of New York, N.Y., uses an ID system in the United States between institutional investors and broker dealers to confirm transactions for DTC eligible U.S. securities. This system does not operate on a central matching basis; institutions must wait for broker dealers to submit trade data for which they must provide an affirmation. For non-DTC eligible securities, the institution must send a message to its clearing agent notifying them of a securities transaction. The institution's clearing agent must manually pre-match the settlement instruction with the executing broker instructions before the actual settlement can occur.

Thomson Financial of Skokie, Ill., provides the OASYS Global service, which also allows institutions and brokers to confirm transactions. OASYS Global, however, does not offer centralized matching and does not automatically generate settlement instructions and route them over the Society for Worldwide Interbank Financial Telecommunication (SWIFT) Financial Network. Additionally, OASYS Global message formats are not based on the SWIFT standards.

The London Stock Exchange SEQUAL product offers a centralized broker to broker matching facility; however, SEQUAL does not generate settlement instructions to clearing agents and its message structures are not based on SWIFT formats.

U.S. Pat. No. 5,497,317 discloses a device and method for improving the speed and reliability of security trade settlements, in which trade settlement information is communicated securely between institutional investors, brokers, and custodians. As defined in this patent, institutional investors consist of retirement and pension finds, mutual fund companies, investment advisors, insurance companies and other investors, which manage and trade for two or more accounts. Custodian is defined as a bank, security depository or other settlement agent. Delivery instructions are stored in database in a format compatible with both Industry Users Group (IUG) and Industry Standardization for Institutional Trade Communication (ISITC) standards. Communication links exist between security trading participants and a central database (which actually consists of two separate databases), and between the participants themselves for exchanging messages (e.g., electronic mail not relating to settlement of a particular trade). Communications links between institutions and brokers are utilized immediately after trade execution to settle the trade. Similarly, trade settlement communications links exist between institutions and custodians. Brokers and custodians input delivery instructions to a delivery database along respective lines. The delivery instructions include information such as the country of origin of the security, the security type, and clearing method details. As delivery instruction sets are added to or modified on the delivery database, alert messages are generated by a central database for communication to the other brokers and custodians; these alert messages inform the brokers and custodians of the delivery instruction changes. The central database includes a wire or wireless transceiver for receiving information for storage and retrieval requests, and for transmitting alerts and retrieved information. Account information includes a custodian identifier for retrieval from the delivery database of the delivery instructions corresponding to the specified custodian identifier. Account information and the retrieved, specified custodian delivery instructions are combined for storage in an account database. A broker internal account number (BIA)/ account identifier table is stored in the account database for use by the central database to generate alert messages for transmission to brokers informing them of changes in account information for BIAs cross-referenced to the account information. The changes may be to either the custodian delivery instruction portion or the account portion of account information. Information retrieved from the central database for use in settling security trades is very accurate since each participant enters information on databases pertaining to it and since alert messages permit affected participants to review changes made to the databases in real time.

In this system, storing custodian delivery instructions in both the delivery database and the account database serves several functions. First, it prevents custodians from making changes to the settlement of securities traded for an institutions' account without the institutions' consent. Second, it permits more rapid retrieval and transmission of security settlement information from the institutions to the brokers since only a single database needs to be accessed.

This system, however, does not provide for direct broker to broker confirmation, in which a secure communication is maintained between the brokers. Furthermore, this system is not compatible with standard message formats in the financial network.

The challenges in crossborder trading are extremely acute. The time difference between counterparties can be as great as 12 hours. Fail rates in certain markets are as high as 30%. Existing processes—laden with outdated technology, a lack of industry standards, and insufficient infrastructure—lead to such errors and their resulting high costs. The market is demanding the following: accommodation of the breadth, depth, and complexity of transaction activity; facilitation of execution and settlement with multiple counterparties; accomplishment of straight-through processing of transactions; evolution of "legacy" systems into "open, interoperability" systems; and leveraging of advanced technology to handle a greater share of all such transactions.

It is thus clear that a system is needed for automating matching of transactions among brokers and custodians, especially for use in conjunction with the SWIFT network or other financial networks.

SUMMARY OF THE INVENTION

It is an object of the present invention to provide a system and method for automatically matching a user's transaction request with another user's match confirmation in a manner compatible with existing financial network standards.

It is a further object of the present invention to provide a method for a user to view and select transactions to match.

It is a further object of the present invention to provide a method for a user to view both the user's own transaction request and the other user's match confirmation.

It is a further object of the present invention to provide the user with an option to view differences between the user's transaction request and another user's match confirmation.

It is a further object of the present invention to provide a method for matching a user's transaction request and another user's match confirmation using a quick confirmation.

The present invention, an embodiment of which is known as Crossmar Matching Service (CMS) provides a method and system for matching order routing of securities and other instrument types, and for matching other transaction information on a post-execution basis, such as during the confirmation and settlement phase. The functions of the present invention occur on the post-execution side of the value chain and include matching the financials, matching the delivery instructions, and confirming those deliveries and instructions. The method and system of the present invention thus further provide a confirmation and settlement system for these functions.

To achieve the stated and other objects of the present invention, as embodied and described below, the invention includes a method of matching a plurality of predetermined financial transactions for a plurality of users, wherein data for the plurality of predetermined financial transactions are categorized into at least one field of a plurality of fields such that data is contained in a total number of fields, and wherein the plurality of users includes at least a first user and at least a second user, comprising: initiating a communication link between the first user and a server; initiating a communication link between the second user and the server; the first user selecting at least one predetermined financial transaction; the second user selecting at least one predetermined financial transaction; selecting a number of fields for obtaining matching, wherein the number of fields is not greater than the total number of fields; and automatically identifying matching pairs of predetermined financial transactions, wherein each matching pair includes a first pair half comprising a first predetermined financial transaction for the first user, and a second pair half comprising a second predetermined financial transaction for the second user, and wherein the first pair half and the second pair half are within the selected number of fields.

To achieve the stated and other objects of the present invention, as embodied and described below, the invention further includes a method for a first user to identify matching pairs of predetermined financial transactions for the first user and a second user, comprising: the first user transmitting at least one set of data for at least one predetermined financial transaction for the first user from a first terminal to a server, wherein each predetermined financial transaction for the first user has a corresponding set of data and a corresponding set of summary data; the first terminal automatically displaying a first combined summary set, wherein the first combined summary set comprises a combination of each of the corresponding sets of summary data for each predetermined financial transaction for the first user; the first terminal automatically providing an option to display the corresponding set of data for a selected predetermined financial transaction; the second user transmitting a second set of data for at least one predetermined financial transaction for the second user from a second terminal to the server, wherein each predetermined financial transaction for the second user has a corresponding set of data and a corresponding set of summary data; the server automatically transmitting to the first terminal the second set of data for at least one predetermined financial transaction for the second user; the first terminal automatically displaying a second combined summary set, wherein the second combined summary set comprises a combination of the first combined summary set and a combination of each of the corresponding sets of summary data for each predetermined financial transaction for the second user; the first terminal automatically providing an option to display the corresponding set of data for a selected predetermined financial transaction for the second user, wherein the first user may toggle between the display of the corresponding set of data for the selected predetermined financial transaction for the first user and the display of the corresponding set of data for the selected predetermined financial transaction for the second user; the first terminal automatically providing an option to select at least two summary sets from the combined set of summary sets for matching predetermined financial transactions; the first terminal automatically providing an option to select to identify automatically matching pairs of predetermined financial transactions, wherein each matching pair includes a first pair half comprising at least one predetermined financial transaction for the first user having a first pair half data set, and a second pair half comprising at least one predetermined financial transaction for the second user having a second pair half data set, the first pair half and the second pair half matched by matching the first pair half data set and the second pair half data set; selecting the option to select to identify automatically matching pairs of predetermined financial transactions; and automatically matching pairs of predetermined financial transactions.

Additional objects, advantages and novel features of the invention will be set forth in part in the description that follows, and in part will become more apparent to those skilled in the art upon examination of the following or upon learning by practice of the invention.

BRIEF DESCRIPTION OF THE FIGURES

In the figures:

FIG. 2A is a flow diagram of an embodiment of the present invention, including indication of interaction with an example base system;

FIG. 2B shows a workflow diagram for an embodiment of the present invention;

FIG. 2C presents a flow diagram for a nonautomated process for foreign exchange trading;

FIG. 2D shows a flow diagram of an embodiment of the present invention, including indication of interaction and use of trading affirmation;

FIG. 2E is a flow diagram of an embodiment of the present invention, including indication of interaction with an example base system and use of trading allocations and MT305s;

FIG. 3 presents a flow diagram of the overall process of crossborder trading and settlement for an embodiment of the present invention;

FIG. 14 presents a summary/report screen, which displays transaction information, for a GUI of an embodiment of the present invention;

FIG. 27A contains the settlement delivery instructions manager window showing the primary subwindow for a GUI of an embodiment of the present invention;

FIG. 27B contains the settlement delivery instructions manager window showing the additional fees subwindow for a GUI of an embodiment of the present invention;

FIG. 27C contains the settlement delivery instructions manager window showing the miscellaneous instructions subwindow for a GUI of an embodiment of the present invention;

FIG. 27D contains the settlement delivery instructions manager window showing the confirm details subwindow for a GUI of an embodiment of the present invention;

FIG. 28C is a table for the case of a settlement message arriving after a confirm message for an embodiment of the present invention;

FIG. 28D shows a table for the case of a confirm message arriving after a settlement message for an embodiment of the present invention.

FIG. 29 presents an example of a standing instructions screen for a GUI of an embodiment of the present invention.

DETAILED DESCRIPTION

Figure 1:
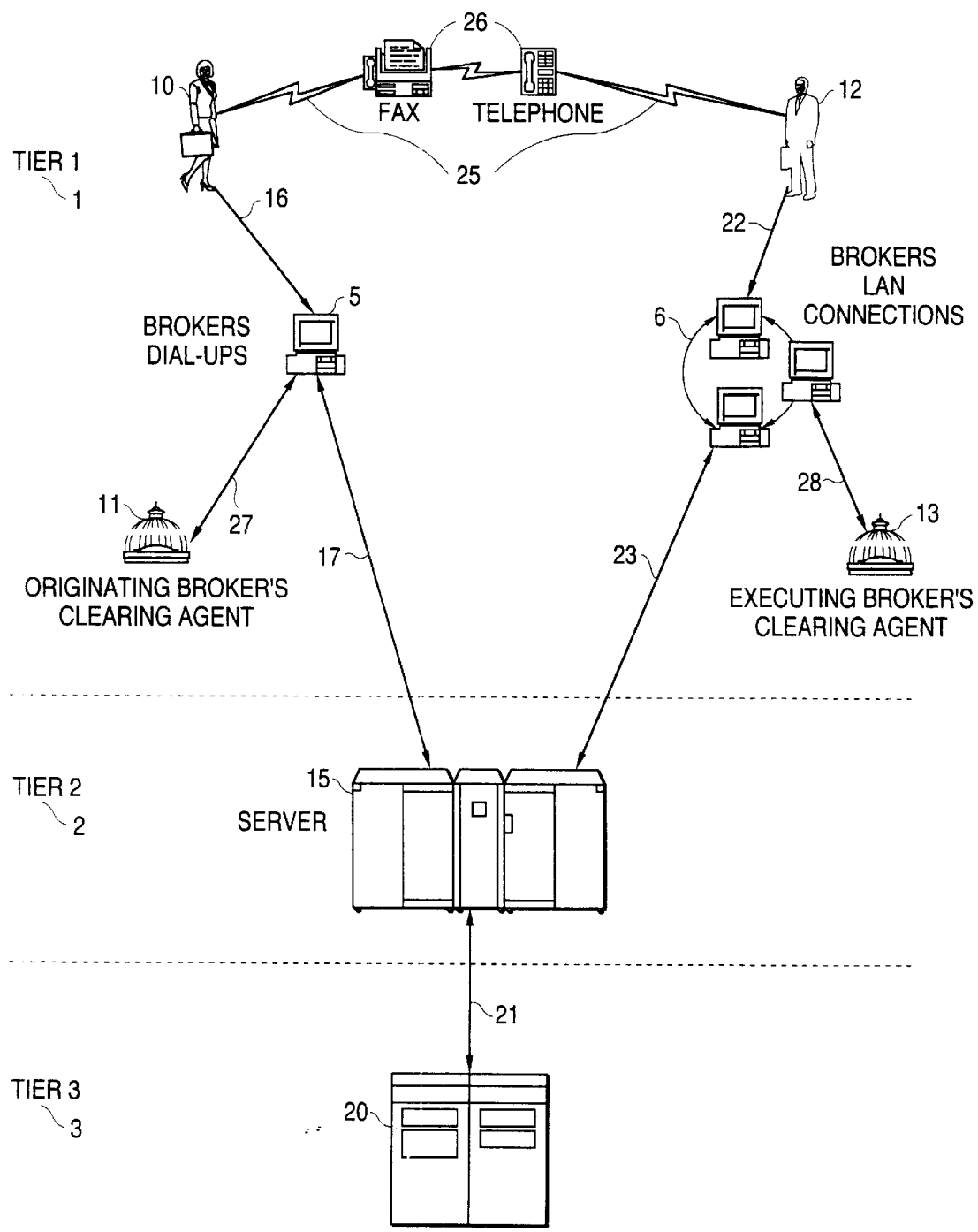
FIG. 1 depicts the overall system elements, including an example base system, for an embodiment of the present invention.

The present invention, an embodiment of which is referred to as Crossmar Matching Services (CMS), provides a method and system for matching order routing of securities and other instrument types, and for matching other transaction information on a post-execution basis during the confirmation and settlement phase. The functions of the present invention occur both on the pre-execution and post-execution sides of the value chain and include matching the financials, matching the delivery instructions, and confirming those deliveries and instructions. The method and system of the present invention thus further provide a confirmation and settlement system for these functions.

The present invention's features of matching order routing information and other matching functions is intended to function primarily in conjunction with an example base system that provides the platform for the underlying transaction to be matched.

An example of a base system, for which the present invention provides matching order routing and other transaction information, is described in applicants' copending application titled METHOD AND APPARATUS FOR TRADING SECURITIES ELECTRONICALLY having U.S. Ser. No. 08/700,836 filed Aug. 21, 1996, now U.S. Pat. No. 5,787,402 and is referred to as "Global Clear". The functions of Global Clear will be described in conjunction with the functions of the present invention. It will be appreciated by those skilled in the art that the matching system of the present invention is likewise applicable to other financial transactions and other trading systems that necessitate a matching method and system, as well as other activities amenable to matching (e.g., documentation matching).

An embodiment of the present invention, which operates in conjunction with a system and method for, among other things, direct broker to broker trading, automatically matches an investor's security order with an executing broker's confirmation and automatically generates and routes via a network, such as the Society for Worldwide Interbank Financial Telecommunication (SWIFT) Financial Network, a settlement instruction to the investor's clearing agent. By allowing securities participants to match orders to executions on trade date and by automatically generating pre-matched settlement instructions to clearing agents on trade date, the system increases the accuracy, reduces the cost, reduces the inherent financial risk, and increases the rate of settlement for all security participants.

In addition to operation in conjunction with the exemplary base system, an embodiment of the present invention includes use of a system and method for facilitating electronic message transmission among the various components of the present invention and other connected components, such as other applications and networks. In an embodiment of the present invention, the system and method for facilitating electronic message transmission is that described in the applicants' pending U.S. patent application titled MESSAGE AGENT SERVER having U.S. Ser. No. 60/050,422 filed Jun. 5, 1997. The system and method of the MESSAGE AGENT SERVER are particularly advantageous for use in the transmission of electronic messages among financial institution networks and application programs and the SWIFT network.

An embodiment of the present invention includes the following features: 1) intra-day trade confirmation—trade terms and delivery instructions (including netting) for all transactions are viewable, verifiable, and confirmable on the trade date; 2) auto-match—all transactions are automatically matched on key financial criteria, and exceptions are reported; 3) quick error identification and auto correction—the cause of all mismatched trades is quickly identifiable, and errors are automatically correctable; 4) applicable message formats, including SWIFT ETC message formats—all messages are designed to be compatible with the latest industry supported SWIFT ETC message formats; 5) multi-currency and multi-security type—the system supports equities, fixed income traded instruments, options, and other derivatives, and supports all International Standards Organization (ISO) recognized currencies; and derivatives thereof, as well as other activities amenable to matching, such as the requisite supporting documentation that often accompanies such financial transactions; 6) automated or manual entry—the system accommodates SWIFT, proprietary file transfer, and manual trade entry input; 7) trade status—the categorization of trade status provides a quick and easy method for highlighting and sorting trades and is configurable to provide a spotlight on exceptions and errors; 8) reports—a comprehensive listing of positions by trade status, security type, counterparty, entity, trade date, and settlement date is included; 9) audit trail—on-line tracking of every event for each transaction and detailed by user, date, and time; 10) security—all messages are authenticated and encrypted, and all users undergo an authorization check before they are allowed to proceed onto the system; 11) standard 32 bit operating system such as Windows NT™ support—CMS is designed to operate in Windows NT™ environments; and 12) multi-site access—system access is available from multiple locations.

FIG. 1 depicts an embodiment of the overall system of the present invention, along with the components of the base system example, Global Clear, which includes three tiers. Tier 1 1 includes the users and their terminals, such as personal computers, Tier 2 2 includes a server, and Tier 3 3 includes a database server. These terminal can include standard features such as a monitor or other visual display device, or other devices for communicating information to the users, such as speakers for providing sound information.

The hardware and software for Tier 1 1 includes a client application and a graphical user interface (GUI) loaded onto users' personal computers 5, 6. The users, the originating broker 10, the originating broker's clearing agent 11, the executing broker 12, and the executing broker's clearing agent 13, are connected to the server 15 via these personal computers 5, 6.

The personal computers 5, 6, which may be configured by the users to automatically dial the server 15 at pre-defined intervals, use multiple operating systems such as Windows NT™. The personal computers 5, 6 support multiple baud rates and support multiple connectivity types, including dial-up public data networks 5, internet service networks, local-area network connections, LAN connections, and other remote connections.

The originating broker 10 runs the software's client software and GUI on a personal computer 5 to perform a function to be matched, such as to develop an order to either buy or sell securities 16.

This order 16 is either saved on the personal computer 5 for later transmittal or the originating broker connects to the server 15 via a modem, a transport control protocol/internet protocol (TCP/IP), via the SWIFT FIN network, or via other remote connection, and sends the order 17 to the server 15.

Tier 2 2 comprises the server 15, a business object server having an operating system (e.g., Windows NT™), a programming language (e.g., Visual C++), and middleware (e.g., Entera version 3.1, produced by Borland International Inc., of Scotts Valley, Calif.). The server 15 receives the order 17, records what time the order arrived and assigns it a reference number.

The server 15 connects to the data access database 20 in Tier 3 3 via an open client connection 21. The data access database 20 holds the standing delivery instructions and other information about individual brokers.

The server 15 matches the originating broker's order 17 with the broker's standing delivery instructions 20 stored in the standing delivery instructions database 20. The standing delivery instructions are used by the clearing agents 11, 13 to settle the trade. Through actions described in detail below, the brokers 10 and 12 can quickly and accurately make permanent changes to the standing delivery instructions or tag a temporary standing delivery instruction to a specific order.

The originating broker's order 17, with the delivery instructions 21, is stored in the server 15 until the executing broker 12 logs into the server 15.

The executing broker 12 connects 22 to the server 15 via a modem, TCP/IP, via the SWIFT FIN network, or via other remote connection on a personal computer 6, which in this case is connected in a local area network, and downloads the originating broker's order 23.

The originating broker 10 may also contact the executing broker 12 directly with a buy or sell order 25 over a system of telephones and/or fax machines 26.

The executing broker 12 fulfills the originating broker's orders to either buy or sell securities, and then sends a confirmation message 23 to the server 15.

The server 15 matches the executing broker's confirmation 23 with the originating broker's original order 17. If the originating broker contacted the executing broker 12 directly 25 via the telephone and/or fax machine 26, the workstation automatically writes an order to match the executing broker's 12 confirmation 23 under direction of the broker 12.

If the executing broker's confirmation 23 does not match the originating broker's original order 17, the server 15 allows the originating broker 10 to visually compare and manually match the originating broker's order 17 to the executing broker's confirmation 23.

If the executing broker's and the originating broker's messages match, the system develops a message notification that the transaction was completed. This message is time stamped as to when the transaction was matched and is generated automatically via the SWIFT network or stored until the originating broker's clearing agent 11 and/or the executing broker's clearing agent 13 log into the server 15.

When the clearing agents 11, 13 log into the server 15, they receive message notifications 27, 28 of the transaction. When the notification is downloaded by the clearing agents 11, 13, the server 15 applies a time stamp as to the time of the download.

The message notification of the completed transaction is also sent 23 to the executing broker 12. By attaching dates and tracking the flow of messages, the system allows secured trading and tracing trading activities such as the changes, additions, or deletions, made to the data.

In an embodiment of the present invention, transactions are entered, maintained, deleted, verified, and confirmed within a Windows NT™-formatted, user-friendly interface. Counterparties can either send in their side of the execution for auto-matching or affirm the trade by manual selection. The status of every transaction is monitored from the workstation, and exceptions are corrected on-line and in real time. An embodiment of the present invention includes import/export capabilities to internal systems, which promotes straight-through processing and eliminates redundant re-keying. Through the use of a generalized message translating capability, such as the MESSAGE AGENT SERVER, in an embodiment of the present invention, the user's proprietary message is parsed and reformatted into a transferable format for the network used, such as a SWIFT ETC standard message, and transmitted to their counterparties through the network, such as the SWIFT FIN network.

Figure 10A:
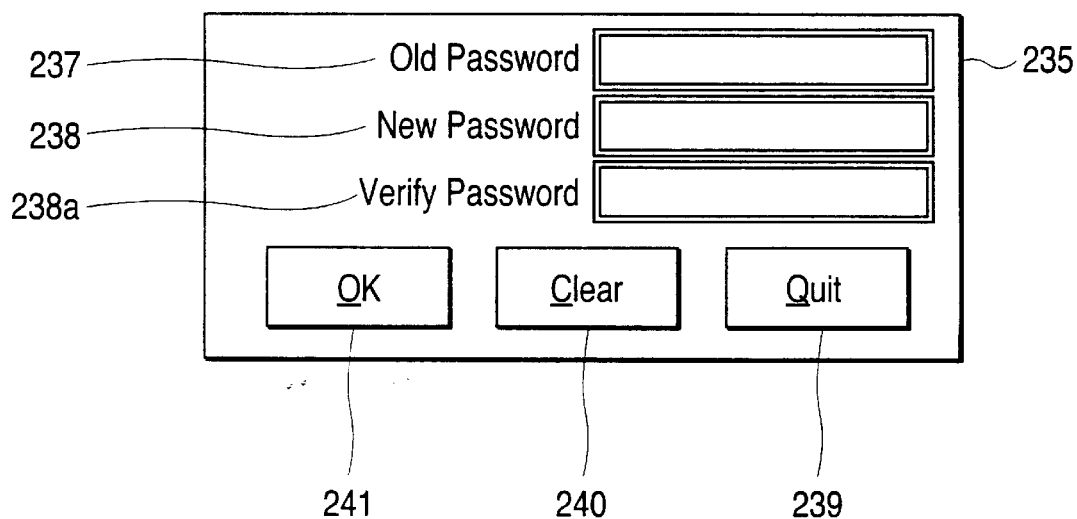
FIG. 10A depicts the change password screen used in the GUI of an embodiment of the present invention.
Figures 1, 10:
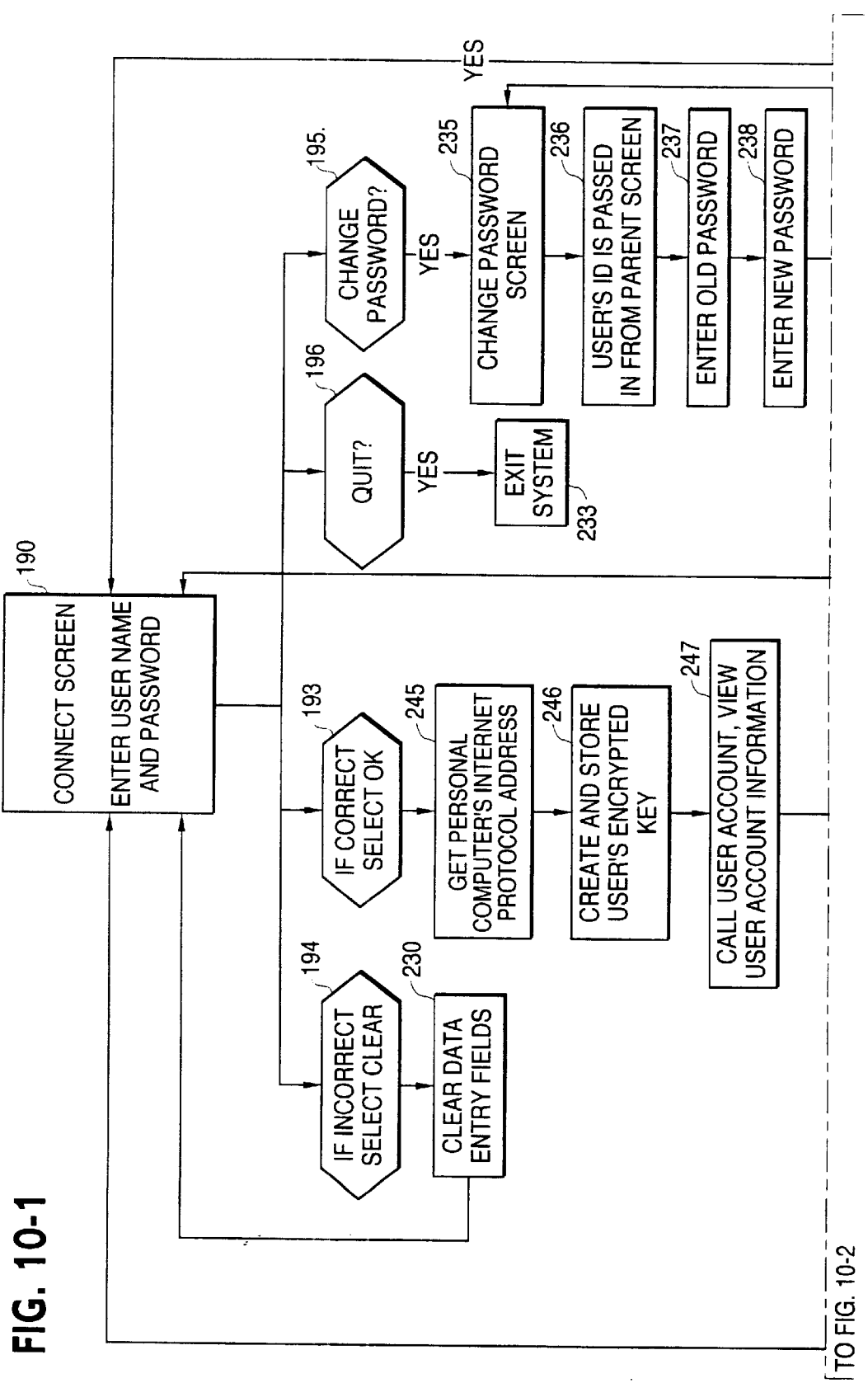
FIG. 10 contains a flow diagram the functions of the main screen for a GUI of an embodiment of the present invention.
Figures 2, 10:
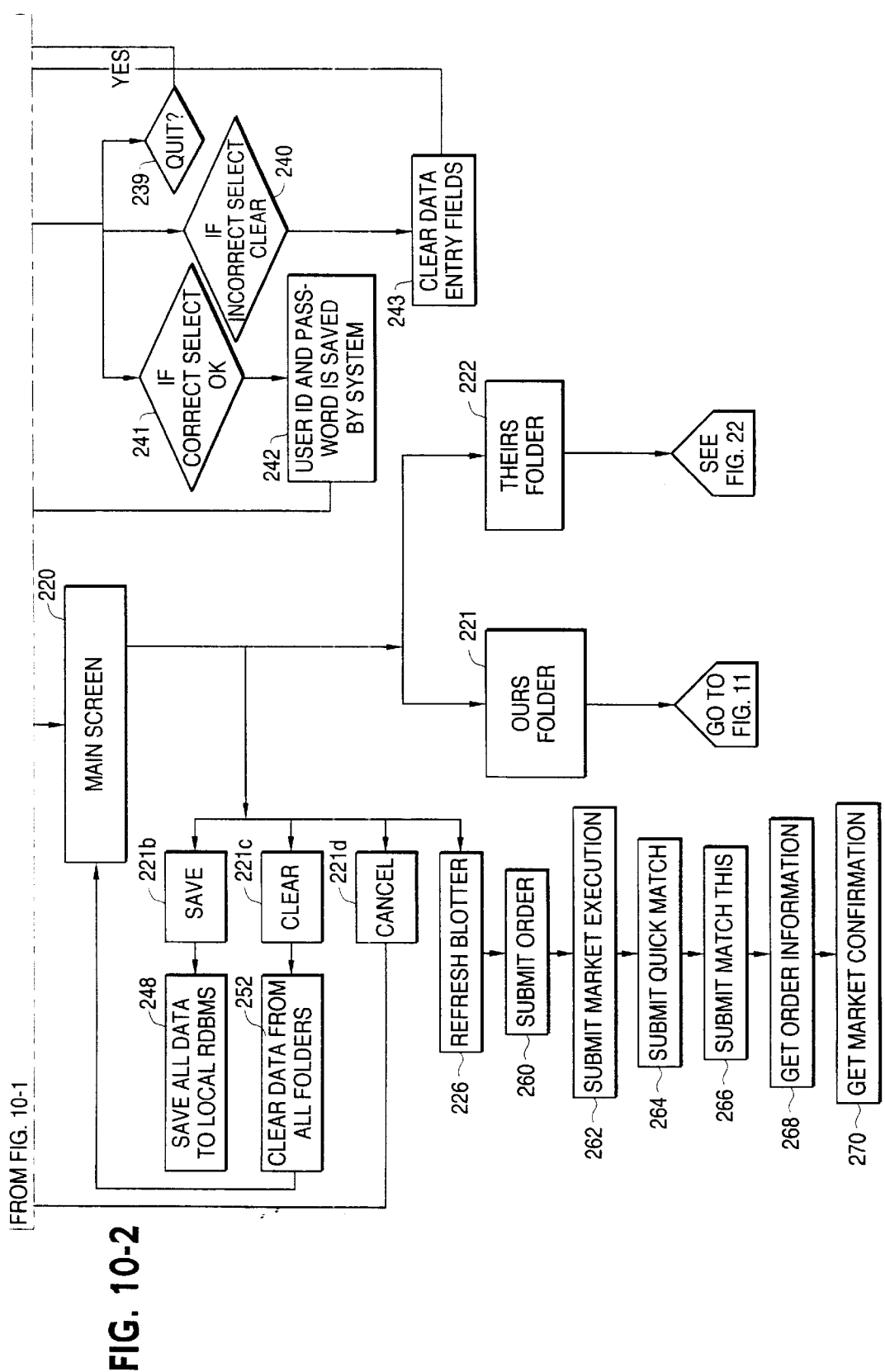

FIG. 2A is a flow diagram of an embodiment of the present invention, including indication of interaction with an example base system. In FIG. 2A, a client trader 30 uses a dealing system 31 to prepare, for example, a buy order for securities. Information regarding the order is transmitted to a file 32 for use for matching purposes. This file 32 is then used by the present invention, such as a locally run CMS 33, to transmit confirmations 34 to the CMS server 35, and to receive from the CMS server 35 a matched confirmation report 34a. The request prepared in the dealing system 31 is also transmitted to the trading host system 36 and then to a settlement system 37. Clearing agents 38 then assure physical delivery or depository 39 of the elements of the request.

As shown in FIG. 2A, the counterparty trader 40 also uses a dealing system 41 to prepare requests. Information regarding activities in this dealing system 41 is also sent to a file 42 for use for matching purposes by, for example, locally run CMS 43. The counterparty trader 40 also transmits confirmations 44 and receives matched confirmation reports 44a from the CMS server 35. Orders and executions may also be performed outside the system, such as through phones 45.

For example, the counterparty trader 40 could make a corresponding sell order to the client trader 30 buy order. Confirmations 34, 44 from the client trader 30 and the counterparty trader 40, respectively, would then be sent to the CMS server 35. The trade would be consummated through the host 36, the settlement system 37, clearing agents 38, and physical delivery or depository 39. After consummation of the trade, matched confirmation reports 34a, 44a would be sent to the client trader 30 and the counterparty trader 40, respectively.

FIG. 2B shows a workflow diagram for an embodiment of the present invention. An embodiment of the present invention includes three levels of work interaction: the bank/broker level 50, the CMS level 51, and the customer/counterparty 52. At the bank/broker level 50, an embodiment of the present invention does not support use of fax transmissions 50a. Embodiments of the present invention do support use of telex 50b, SWIFT 50c, and ASCII files

50d. The information from telex 50b, SWIFT 50c, and ASCII file 50d is fed to the CMS sender 51a. For example, a foreign exchange option is sent to the sender 51a. Under the foreign exchange heading, the text message status changes to "unconfirmed." Once the counterparty affirms the confirmation, the text status changes to "confirmed."

As shown in FIG. 2B, at the customer/counterparty level 52, a user at a workstation 52a is able to transmit information to the CMS receiver 51b. The receiver 51b is able to read and/or print, for example, a foreign exchange message on CMS. The receiver may agree with the text, producing a "confirmed" message, or disagree with the text and leave the action "unconfirmed" with a free-format message to the sender. CMS automatically sorts the activities, such as foreign exchange, according to header type. Thus, as shown in FIG. 2B, a decision point is whether the customer/counterparty 52 agrees with the confirmation 53. If yes 54, the confirmation is "confirm," and the customer/counterparty 52 makes a printout as part of the deal record and audit trail. If the result of the decision point 53 is not to confirm 55, the system advises the sender of confirmation error. Confirmation status remains "unconfirmed" until either the bank/broker 50 "cancels" or amends it, or the customer/counterparty 52 "confirms."

FIG. 2C presents a flow diagram for a nonautomated process for foreign exchange trading. As shown in FIG. 2C, with systems that don't include the method and system of the present invention, the process of trading and other activities is the same as that shown in FIG. 2A, but matching must be performed using, for example, a client telex fax 60 and a counterparty telex fax 61. Confirmations 60a and affirmations 60b are transmitted form the client telex fax 60 to the counterparty telex fax 61, and confirmations 61a and affirmations 61b are transmitted from the counterparty telex fax 61 to the client telex fax 60. Thus trades cannot be automatically matched or simply matched using the method and system of the present invention.

FIG. 2D shows a flow diagram of an embodiment of the present invention, including indication of interaction and use of trading affirmation. An embodiment of the present invention with affirmation includes a similar process to that shown in FIG. 2A; however, an additional step of affirmation 34b is transmitted from the client local CMS system 33 to the CMS server 35. In addition, in an embodiment of the present invention, banks act as the clearing agents and the counterparty local CMS system 63 utilizes a bank information network, such as the SWIFT network.

FIG. 2E is a flow diagram of an embodiment of the present invention, including indication of interaction with an example base system and use of trading allocations and MT304s. An embodiment of the present invention with trading allocations and MT304s includes a similar process to that shown in FIG. 2D. However, both the client local CMS system 65 and the counterparty local CMS system 63 utilize, or may or may not utilize, a banking network, such as the SWIFT network. Block confirmations 65a and allocations 65b are transmitted from the client local CMS system 65 to the CMS server 35, and confirmations 65c and matched reports 65d are transmitted from the CMS server 35 to the client local CMS system 65. Similarly, block confirmations 63a and allocations 63b are transmitted from the counterparty local CMS system 63 to the CMS server 35, and confirmations 63c and matched reports 63d are transmitted from the CMS server 35 to the counterparty local CMS system 63. In addition, an MT304 67 is used via the SWIFT network to communicate information from the CMS server 35 to the clearing agent banks 38.

FIG. 3 presents a flow diagram of the overall process of crossborder trading and settlement for an embodiment of the present invention using the SWIFT network. As shown in FIG. 3, first an order via an MT502 message is made between an investment manager crossborder investor 70 and a broker 71. The order is then transmitted from the broker 71 to a local broker 72 via an MT502 message. The local broker 72 then places an order with a stock exchange or market maker. Information indicating that the order is filled is then transmitted from the stock exchange or market maker 73 to the local broker 72. Trade confirmation is transmitted back and forth from the local broker 72 and the broker 71 via an MT518. The broker 71 then transmits an execution notice via an MT513 to the investment manager crossborder investor 70, allocations via MT514s are transmitted from the investment manager C/B investor 70 to the broker 71, and trade confirmation via an MT515 is sent from the broker 71 to the investment manager crossborder investor 70.

As shown in FIG. 3, a settlement security instruction via an MT52x is then sent from the broker 71 to the global clearing agent 74, and securities settlement instructions via MT52x messages are sent from the global clearing agent 74 to the local clearing agent 75, from the investment manager crossborder investor 70 to the global custodian, and from the global custodian 76 to the local sub custodian 77. Next, an FX block/confirm message is sent via an MT300/MT305 from the investment manager crossborder investor to the FX trader 78. The FX trader 78 sends an FX confirm message via an MT300/MT305 to the investment manager crossborder investor 70. The investment manager crossborder investor 70 sends an FX allocation message via an MT303 to the FX trader 78. The FX trader 78 then sends an FX confirm message via an MT300 to the investment manager crossborder investor 70.

Next, as shown in FIG. 3, the investment manager crossborder investor 70 sends a secure funds/credit Demand Deposit Account (DDA) to local funds management 79. An FX settlement instruction message via an MT304 is then sent from the investment manager crossborder investor 70 to the global custodian 76. An MT200 message is sent from the global custodian 76 to the local sub custodian 77. The local broker 72 then performs physical delivery or local depository 80; the local clearing agent 75 performs physical delivery or local depository 80; and the local sub custodian 77 performs physical delivery or local depository.

As further shown in FIG. 3, the local sub custodian 77 then transmits a settlement securities advice via an MT53x message to the global custodian 76. The local sub custodian 77 also provides portfolio advice/reporting to the global custodian 76. The global custodian 76 provides portfolio advice/reporting to the investment manager crossborder investor 70. The investment manager crossborder investor 70 provides portfolio advice/reporting to the local funds management 79. The local clearing agent 75 provides portfolio advice/reporting to the global clearing agent 74. The global clearing agent 74 provides portfolio advice/reporting to the broker 70. This portfolio advice/reporting includes a securities holding statement via an MT571, a securities transaction statement via an MT572, and a cash statement via an MT950.

Figure 4:
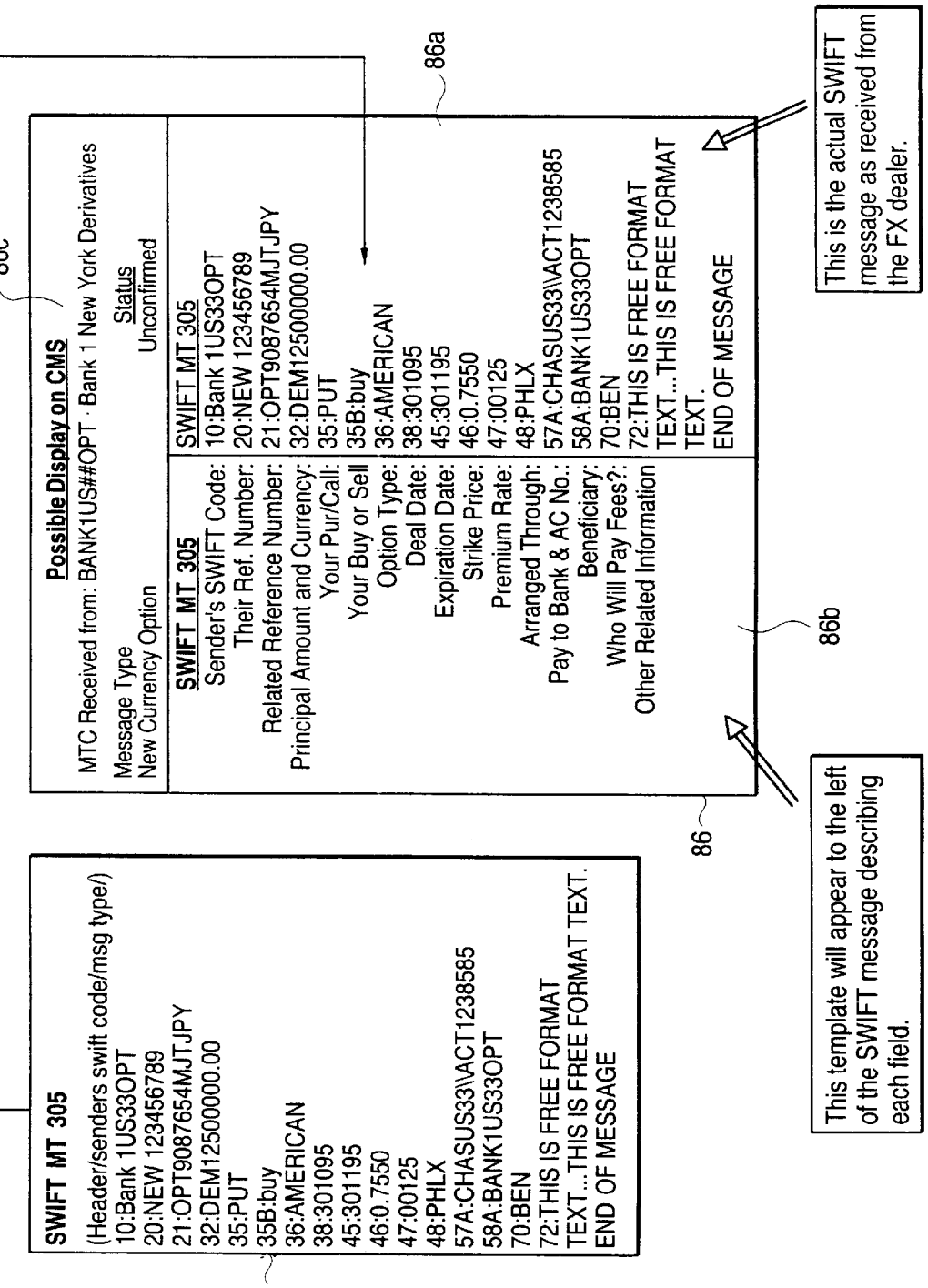
FIG. 4 shows the CMS template for an embodiment of the present invention.

FIG. 4 shows the SWIFT/CMS template according to an embodiment of the present invention. FIG. 3B presents information on the template for a SWIFT MT305 message 85. Information from the MT305 message 85 is transferred to the possible display on CMS 86 into a display area 86a of the actual SWIFT message as received from the FX dealer. The display on CMS 86 also includes a template side 86b, which appears to the left of the SWIFT message side 86*a,* as shown in FIG. 3B. Summary information 86*c* is also included at the top of the display on CMS 86.

Figure 5:
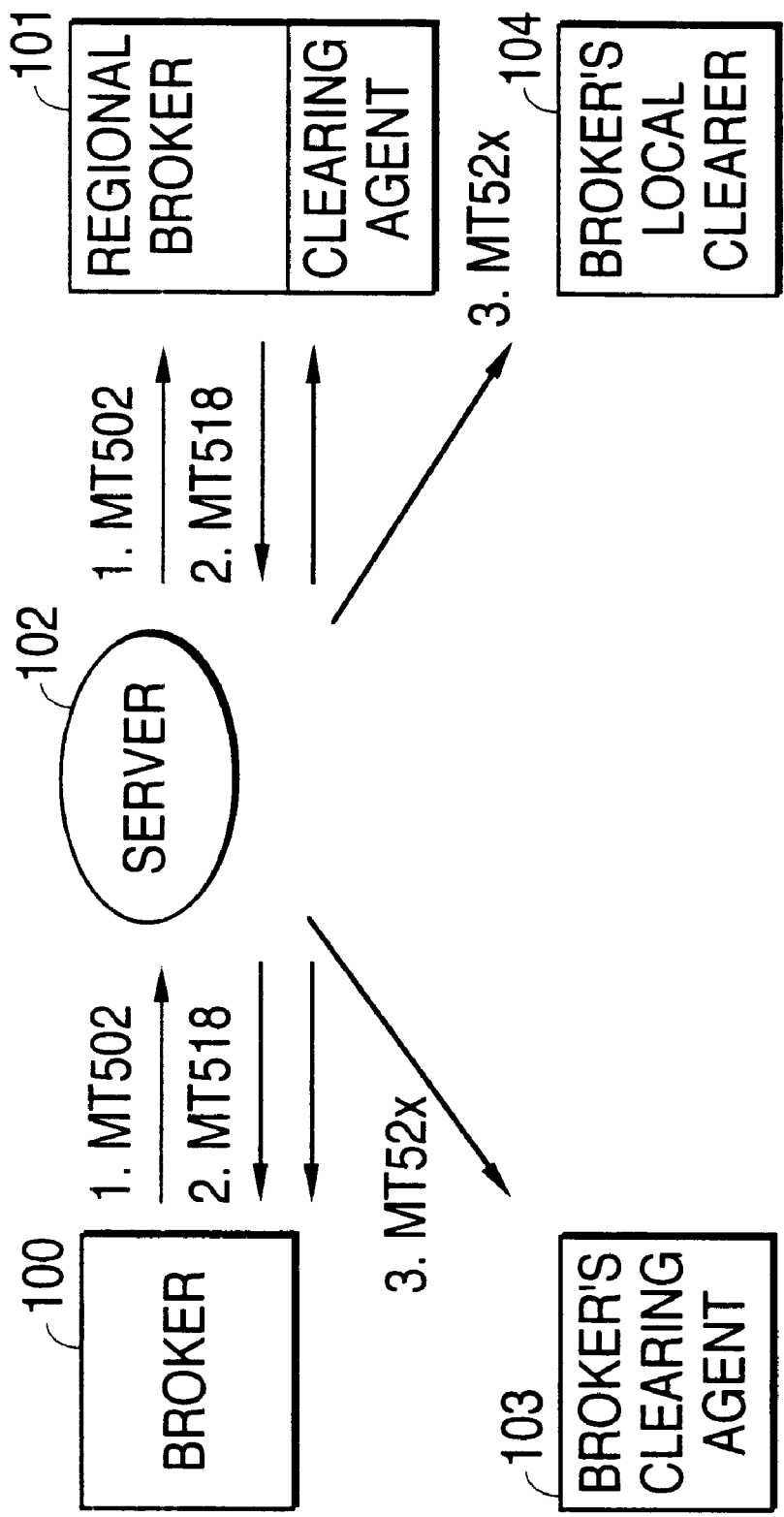
FIG. 5 depicts the message flow according to the method of the present invention for performing trade confirmation.

Referring to FIG. 5, an embodiment of the present invention functions in conjunction with a number of activities that occur within the base system, such as Global Clear. With an embodiment of the present invention, an originating broker 100 transmits a message to an executing broker 101 to buy or sell securities in the SWIFT MT502 format. The message is transmitted from a user's workstation via the public data network (PDN) and is stored on a server 102. The server 102 stores the message until the executing broker 101 manually connects to the server 102 and downloads the data. The data is then presented to the regional broker 101 on a workstation in a combined MT502/MT518 message format. After the order has been executed on the executing exchange, the user 101 enters the required data and transmits a SWIFT MT518 message to the server 102. The server 102 then matches the executing broker's MT518 message with the originating broker's MT502 message and constructs an MT52x message. The SWIFT MT52x message is then sent to the originating broker's clearing agent 103, and if necessary, to the originating broker's local clearing agent 104. The executing broker 101 also receives a copy of the MT52x message. The originating broker 100 also receives the MT518 message. The originating broker 100 is also able to enter settlement data on the MT502 order message.

SWIFT formats, as used in an embodiment of the present invention, will now be further described. In an embodiment of the present invention, an order message in SWIFT format is an MT502 message. An order side confirmation message in SWIFT format is designated as an MT518. A receive against payment message in SWIFT format is designated as an MT521 and a deliver against payment message is designated as an MT523. A receive free message in SWIFT format is designated as an MT520 and a deliver free message is designated as an MT522.

While the present invention has been described with respect to the existing SWIFT formats, as SWIFT is in the process of modifying these formats at the time of filing this application, it should be understood that the present invention applies to the new formats as well.

An example of a transaction according to an embodiment of the present invention operating in conjunction with an example base system, such as Global Clear, will now be described with references to the accompanying figures.

FIG. 5 may also be further used to depict an example of a transaction processed and matched in accordance with an embodiment of the present invention. In this example, within the example base system, company A 100, in Hong Kong, places an order with company B 101, in the Philippines to purchase 1,000 shares of XYZ Securities. Company A 100 sends an MT502 order to buy to the server 102. Company B 101 retrieves the message and, after the order has been executed on the Makati Exchange, sends an MT518 message to the server 102. In an embodiment of the present invention, a match is made of the originating broker's MT502 message with the executing broker's MT518 message, and an MT521 message is automatically constructed using the data elements from the MT502 and the MT518. The server 102 automatically forwards the message to company A's clearing agent 103, financial institution C, in Hong Kong and to company A's local clearing agent 104 in the Philippines. Company B 101 receives an MT523 message. Company A 100 also receives the MT518 message.

An overview of the system architecture of the example base system and an embodiment of the present invention will now be presented.

Figure 6:
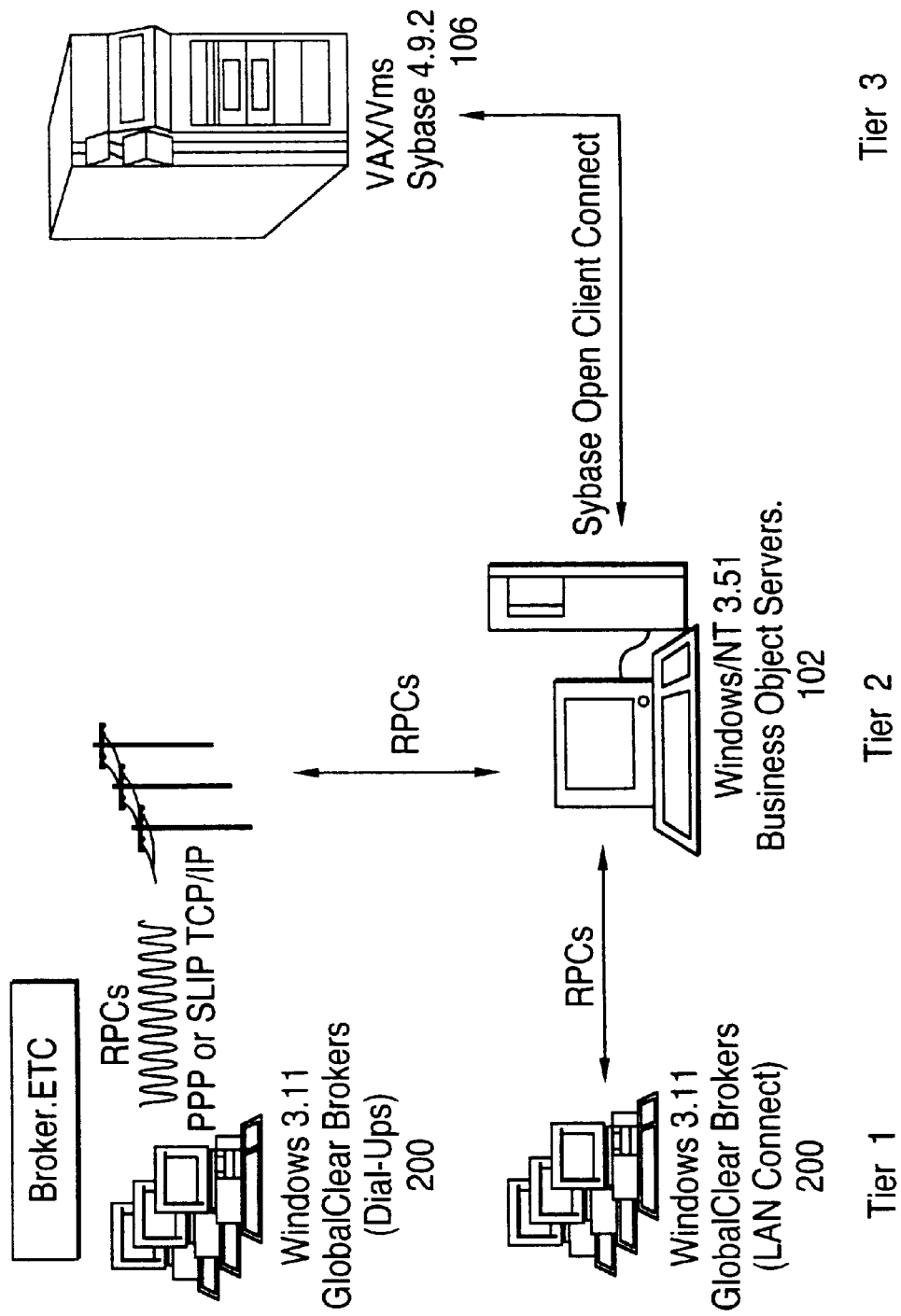
FIG. 6 depicts an embodiment of the system of the present invention.

FIG. 6 depicts the architecture of the exemplary base system for an embodiment of the present invention. Each broker has an identical workstation 200. Each of these workstations can connect to the server 102 either via modem or local area network (LAN). The server 102 is connected to the database 106. The workstations 200 execute an application program that presents a graphical user interface (GUI) to the system to the brokers.

For use in conjunction with an embodiment of the present invention, each workstation 200 consists of a terminal, such as a personal computer (PC). The PC is programmed to present a GUI, by which the broker can connect to the server 102 and format and send a buy or sell message in an MT502 format to the server 102. In addition, the GUI permits the broker to connect to the server 102, and download MT502 messages from other brokers directed to the broker. The GUI also permits the brokers to modify standing delivery instructions that are stored in the database 106; these instructions are appended to the messages. However, both the originating broker and the executing broker can manually override the standing delivery instructions stored in the database by entering settlement data on the MT502 and MT518 messages.

In an embodiment of the present invention, the operating system for the workstation includes a 32 bit operating system, such as Windows NT™.

The system of an embodiment of the present invention uses messaging formats developed by SWIFT, making it an efficient communication and trade confirmation system compatible with SWIFT messages standards and the SWIFT financial network. It will be appreciated by those skilled in the art that the present invention may operate with any public data network.

The server also has the ability to generate a message asynchronously to a receiving party via SWIFT or any other data network without the user having to solicit the server. This is accomplished by using a distributed computing environment where a user's workstation acts as both a client and a server. The central server contains a remote procedure call that creates and generates an unsolicited message to the user's workstation.

Figure 7:
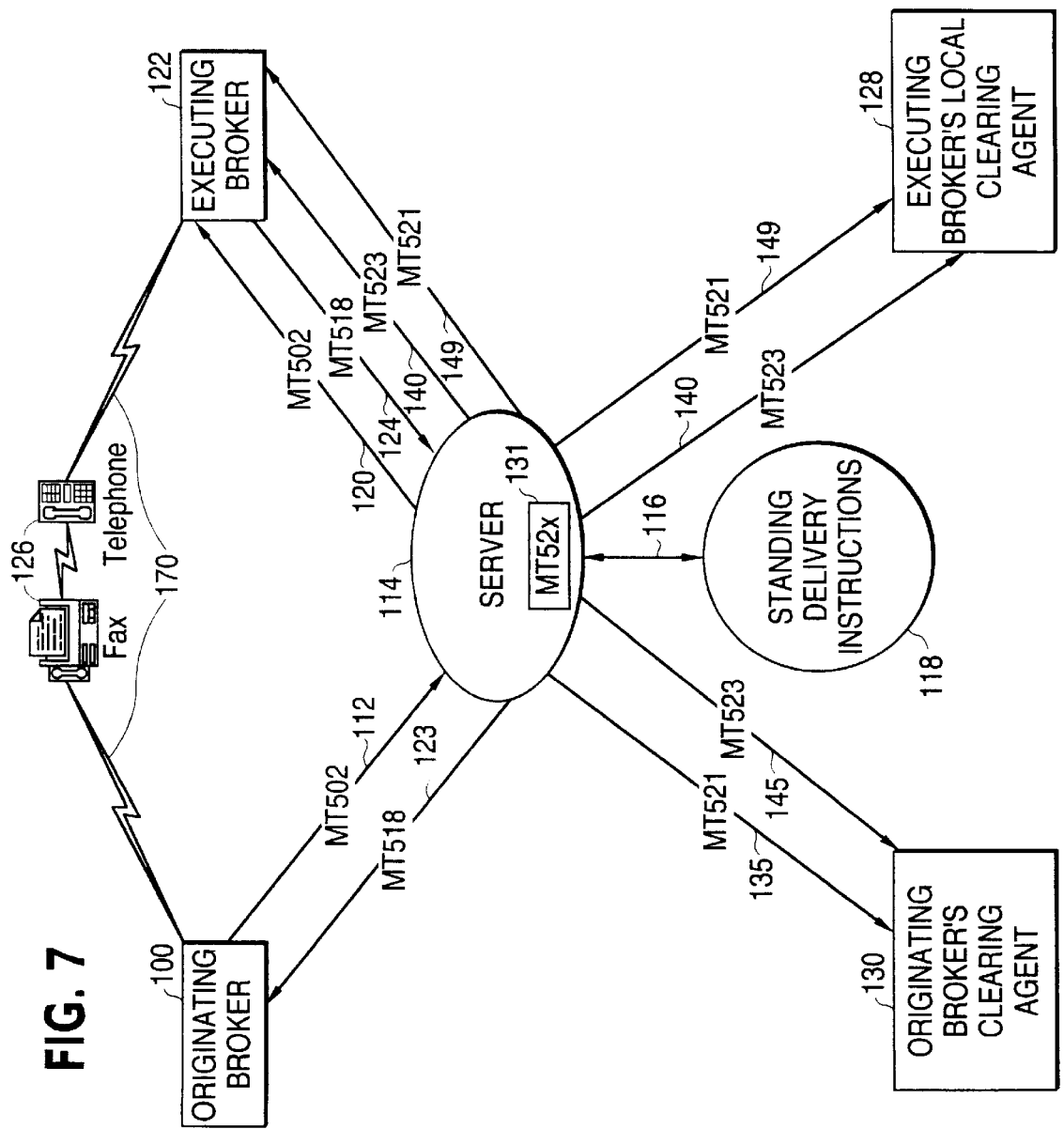
FIG. 7 depicts the flow and type of messages sent to and from the system for an embodiment of the present invention.

FIG. 7 depicts the flow and type of messages sent to and from the example base system as used in conjunction with an embodiment of the present invention. The originating broker 100 writes an order to either buy or sell securities 112 to the executing broker 122. This message 112 is coded according to the SWIFT securities message format as an MT502 message and sent to the server 114. The server 114 receives the order 112, stamps it with the time received, assigns a reference number, and adds the originating broker's standing delivery instructions 116, pre-entered into a database of standing delivery instructions 118.

Standing delivery instructions 116 allow all the parties, the originating broker 100, the originating broker's clearing agent 130, the executing broker 122, and the executing broker's clearing agent 128 to monitor the status of the transaction. The standing instruction database 118 contains the standing delivery instructions 116. The standing delivery instructions are identified by the originating broker's User ID and subaccount, and specify the place of settlement, country of settlement, method of settlement, and security type.

The standing delivery instructions 116 allow the originating broker 100 and the executing broker's clearing agents, 130 and 128, to settle the trade. The originating broker 100 and the executing broker 122 may use the standing instructions 116 or customize each orders' delivery instructions. To override the standard delivery instruction database 118, the originating broker 100 or the executing broker 122 enters settlement data on the MT502 orders 112 or the MT518 confirmations 124.

The server 114 saves the originating broker's MT502 buy or sell order 112 until the executing broker 122 logs into the system and downloads the order 120.

The executing broker 122 logs into the server 114 and may display or retrieve either all open orders, all MT52x messages, all MT53x messages, or all messages to their work station. In this case, the executing broker 122 downloads orders 120 from the server 114. The system then forwards the originating broker's message, with the attached delivery instructions 120 to the executing broker 122. With a successful download, the server 114 attaches a time stamp of when the message download occurred to the message 122.

The originating broker 100 may also send a buy or sell order 170 to the executing broker 122 through an alternate system than the system, using the current system of either a telephone or a fax machine 126.

The executing broker carries out the MT502 buy or sell order 120 or 128 and develops an MT518 confirmation 124 that the order was completed. The executing broker may either save the MT518 market confirmation locally on a personal computer or send the MT518 market confirmation 124 to the server 114 immediately.

Within an embodiment of the present invention, the server 114 takes the executing broker's confirmation 124 and matches it against the originating broker's order 112. This process is conducted in the background without user intervention.

The originating broker 100 may also use a telephone or fax to place an order 128 directly to the executing broker 122. When the originating broker 100 receives the executing broker's MT518 message 124, the originating broker 100 checks for originating broker's MT502 message 112. If an MT502 112 is not found, the originating broker 100 clicks on a generate button to automatically generate a buy or an MT502 sell order 112. The system of an embodiment of the present invention then automatically matches the generated order 112 to the executing broker's confirmation 124.

If the MT518 market confirmation 124 and the MT502 buy or sell orders 112 do not match, the server 114 allows the originating broker 100 to visually compare and manually match the MT518 market confirmation 123 and the MT502 buy or sell order 112.

If the executing broker's and the originating broker's messages match, the system of an embodiment of the present invention develops an MT52x message notification 131 using the data elements from the MT502 112, the MT518 124 and the standing delivery instructions 116. This message is time stamped and stored until the clearing agent(s) 128, 130 log into the server 114. When the server 114 sends the MT52x message 131, it applies a time/date stamp confirming the time of download. The MT518 message 123 is also sent to the originating broker 100.

The type of MT52x 131 message notification sent to the originating broker's clearing agent 130 depends upon whether the originating broker's MT502 order 112 was a buy or a sell order.

If the MT502 message 112 was a buy order, the server constructs and sends an MT521 message 135 to the originating broker's clearing agent 130 and constructs and sends an MT523 message 140 to the executing broker 122 and the executing broker's clearing agent 128. If the MT502 message 112 was a sell order, the server constructs and sends an MT523 message 145 for the originating broker's clearing agent 130, and constructs and sends an MT521 message 149 to the executing broker 122 and the executing broker's clearing agent 128.

When the broker enters the system, the server operates in conjunction with a graphical user interface according to an embodiment of the present invention. References will now be made in detail to an embodiment of the present invention for a Windows NT™-based GUI, an example of which is illustrated in the accompanying drawings.

To log in to the CMS server, the user performs one of the following methods. In the first method, as shown with regard to FIG. 8, the user selects login to the server 161, also referred to as the host, from the file menu 150. In an embodiment of the present invention, the broker is then greeted by the connect screen of the server, an example of which is depicted in FIG. 8A. In the second method, the user clicks once on the online button (which reads "offline") of the main screen, as shown in FIG. 9 (described further below).

With either method, the connect screen 190, shown in FIG. 8A, then appears, which enables the broker to enter an identification 191 and password 192. The broker selects OK 193 or clear 194 to correct. In addition, the broker can change the password at this level by clicking on the change password button 195. Once the user is connected to CMS the online button reads "online," as shown in FIG. 9.

Figure 8:
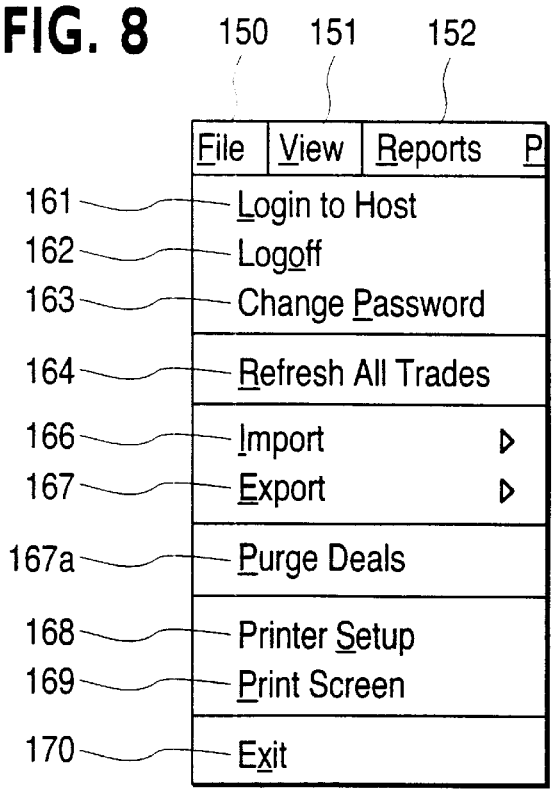
FIG. 8 shows the file menu commands for a graphical user interface (GUI) for an embodiment of the present invention.
Figure 8A:
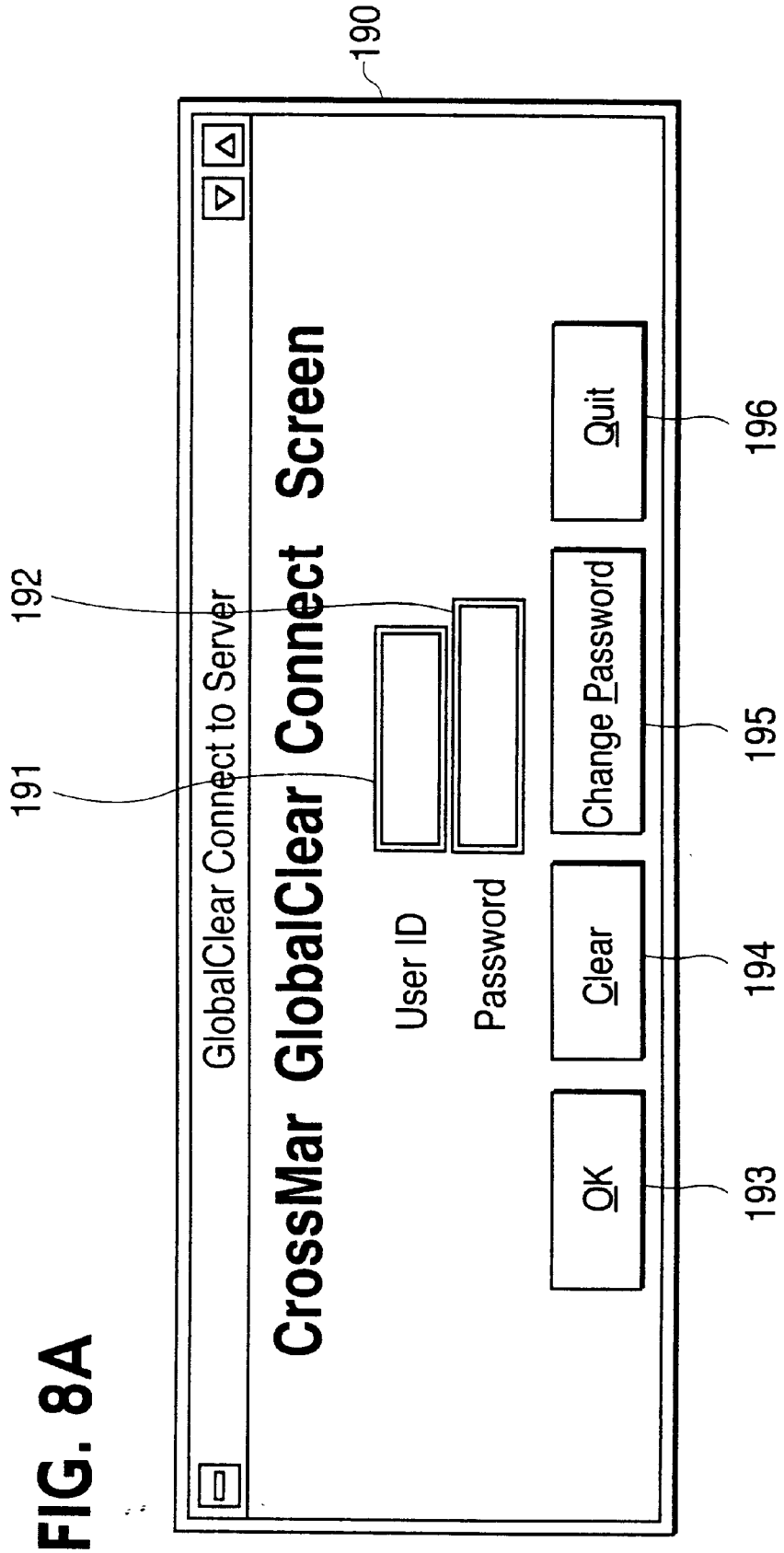
FIG. 8A is a representation of a connect screen used in the originating broker's computer in the system of an embodiment of the present invention.
Figure 9:
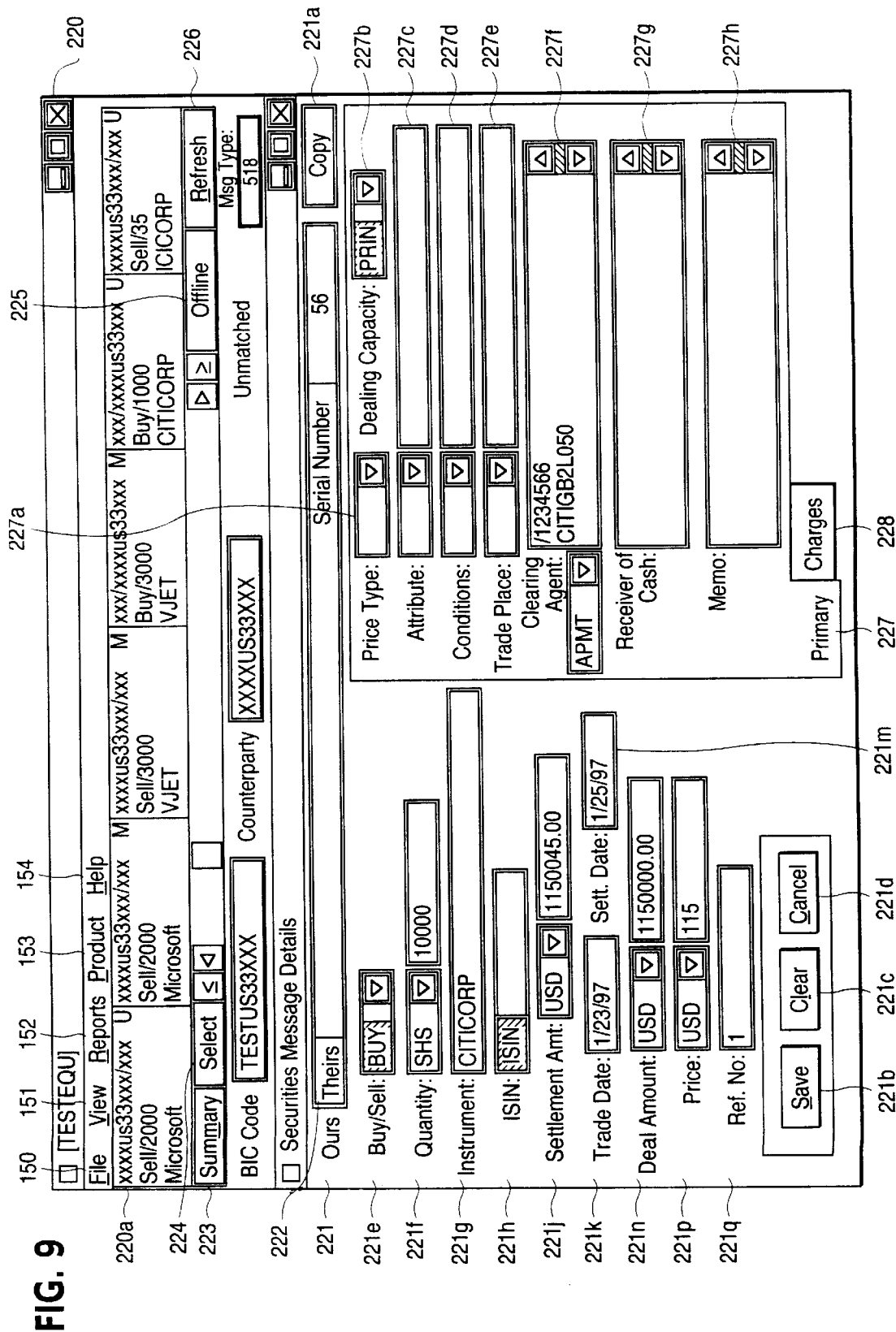
FIG. 9 represents a main screen with the "ours" window selected for a GUI of an embodiment of the present invention.

To log off from the server, the user performs one of the following: 1) selects log off 162 from the file menu 150, as shown in FIG. 8; or 2) clicks once on the online button of the main screen, as shown in FIG. 9, below. Once the user is disconnected, the online button of the main screen changes to "Offline."

In order to properly function, CMS requires that a number of fields contain data. A list of example data elements for example instrument types is shown in the Appendix. This list is not mean to be all inclusive. The glossary contains other terms used in connection with the present invention.

As shown in FIG. 9, the main screen window 220 is used to enter and view trades. A trade is divided into two components: "ours" 221 and "theirs" 222. The "ours" component further includes toggles to subpanels for primary 227 and charges 228. The main window 220 has the following buttons and input boxes to make entering and viewing confirmations easy: buttons for copy 221a, save 221b, clear 221c, and cancel 221d; boxes for buy/sell 221e, quantity 221f, instrument 221g, ISIN 221h, settlement amount 221j, trade date 221k, settlement date 221m, deal amount 221n, price 221p, and reference number 221q.

The primary component 227 includes boxes for price type 227a, dealing capacity 227b, attribute 227c, conditions 227d, trade place 227e, clearing agent 227f, receiver of cash 227g, and memo 227h.

The trade blotter section 220a of the window 220 displays all the confirmations that the user has either created, sent, or received. An embodiment of the present invention includes fields (or sets) of elements and data. The elements and data in the elements for the field are presented to the user in the trade blotter and the trade summary (described further below). To view an item on the trade blotter section 220a, the user moves the cursor to the item and double clicks. Once selected, the item turns to gray in the trade blotter section 220a and appears on the screen in either the "ours" 221 or "theirs" 222 panel.

The online button 225 indicates if the user is currently connected to the CMS server. If the user is connected, the button appears as "online". If the user is disconnected, the button appears as "offline". Clicking on the button 225 when it displays "online" disconnects the user from the server.

Clicking on the refresh button 226 sends all pending confirmations on the workstation to the server and retrieves all confirmations that have been modified by a counterparty since the last time the user refreshed the local database.

At the top of the window are several pulldown menus. These pulldown menus include file 150, view 151, reports 152, product 153, and help 154.

FIG. 10 diagrams how both the originating broker and the executing broker may use the system via the GUIs according to an embodiment of the present invention. The originating broker may enter, maintain, and cancel orders to buy or sell securities through this GUI on or off-line. The executing broker may display all open orders, and enter confirmation data on the GUI during on-line and off-line hours. All data is entered through pop-up and scrolling windows containing pre-defined fields (or sets) and tables of data where applicable.

In FIG. 10, the broker is greeted with a connect screen 190, shown in FIG. 8A. The broker enters a user name and password. If the password is incorrectly entered, the broker chooses the clear button 194, and the system clears all data fields 308 and returns the broker the connect screen 190. If the broker decides not to enter the system, the broker selects the quit button 196 and exits the system 233.

If the broker elects to change the password, the broker selects the change password button 195, and the GUI shows the change password screen 235, as shown in FIG. 10A. The system passes the broker's User ID to this screen's data fields 236. The broker enters the old password 237 and enters the new password 238, and verifies the new password by entering it again 238a. If the broker decides not to change the password, the broker selects the quit button 239 and returns to the connect screen 190. If the broker decides the password entered is incorrect, the broker selects the clear button 240. The data fields are cleared 243 and the broker is returned to the change password screen 235. If the broker decides the information is correct, the OK button is selected 241 and the User ID and new password is saved by the system 242, then the system returns to the connect screen 190.

If the broker decides the password entered at the connect screen 190 is correct, the broker selects the OK button 193. The system then assigns the personal computer an internet protocol address 245. Then it creates and stores the User's ID, password, and internet protocol address as the user's encrypted key 246. The user's account is called from the personal computer's memory, the system accesses the user's account information 247 and displays the main screen 220 (see FIG. 9).

As shown in FIG. 10, selecting the save button 221b saves all information entered on the main screen 220 to a local relational database management system 248, such as database engines provided by Oracle™ Corporation of Redwood Shores, Calif., or Sybase Corporation of Emeryville, Calif. Selecting the clear button 221c clears all the panels of entered information 252 and returns the user to the main screen 220. Selecting the cancel button 221d returns the user to the connect screen 190. Selecting the refresh blotter button 226 causes the personal computer to submit the order 260 and the execution information 262 to the server. The server uses the quick match information 264 and matches this information 266. The server also retrieves order information 268 and gets the market confirmation 270 from the personal computer. This downloads all the orders and executions that are active on the server. Refreshing 226 the trade blotter and the trade summary screen sends all pending trades to the server and retrieve all trades that have changed since the last time the broker accessed the server.

Figure 11:
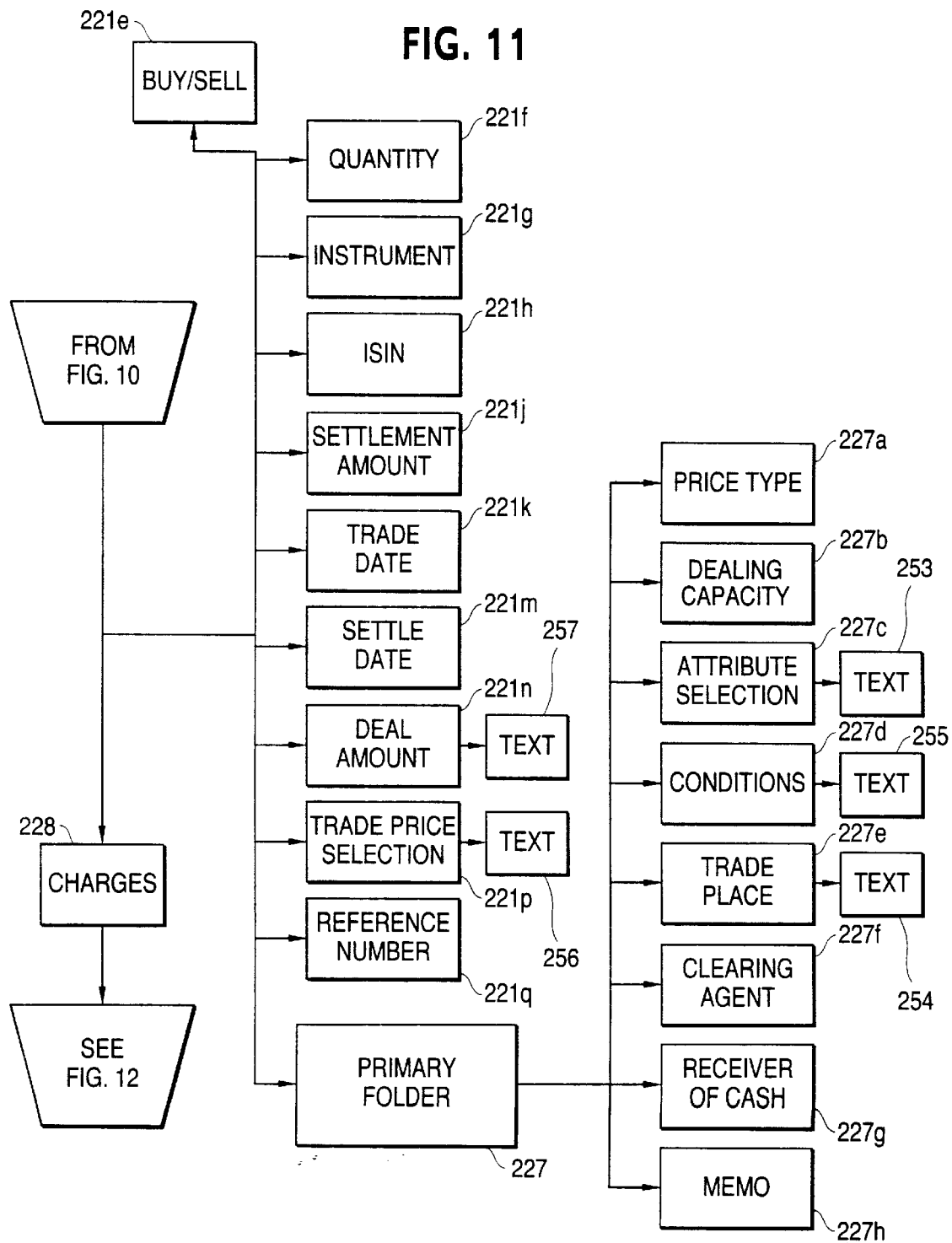
FIG. 11 shows a flow diagram of the functions of the "ours" panel contained in the main screen for a GUI of an embodiment of the present invention.

FIG. 11 describes use of the order panel 221 contained in the main screen 220, as shown in FIG. 9. As shown in FIG. 11, the user, who is, for example, developing an MT502 order, enters information on the "ours" panel 221. The "ours" panel 221 includes a button 221e of either buy or sell.

The user selects the following buttons and input boxes: quantity 221f, instrument 221g, ISIN 221h, settlement amount 221j, trade date 221k, settlement date 221m, deal amount 221n with text 257, price 221p with text 256, and reference number 221q. The primary panel 227 includes boxes for price type 227a, dealing capacity 227b, attribute 227c and text 253, conditions 227d and text 255, trade place 227e and text 254, clearing agent 227f, receiver of cash 227g, and memo 227h.

Figure 22:
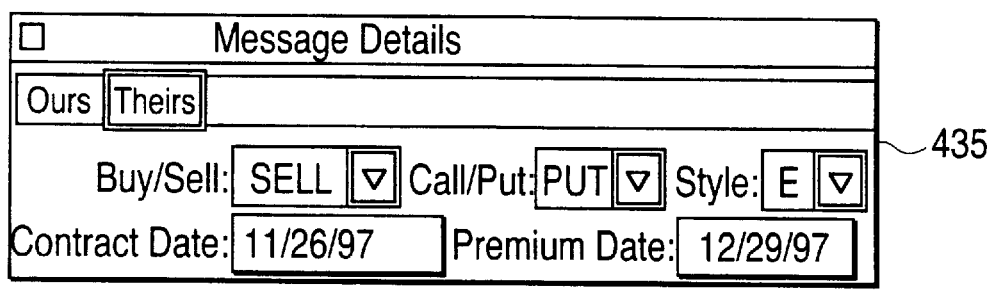
FIG. 22 contains the "theirs" panel used in quick matching a confirmation for a GUI for an embodiment of the present invention.

The use of the "theirs" panel 222 is described in conjunction with the quick match function, described below in relation to FIGS. 22–23. To add charges, the user clicks once on the charges button to display the charges panel 228, as shown in FIG. 12.

Figure 12:
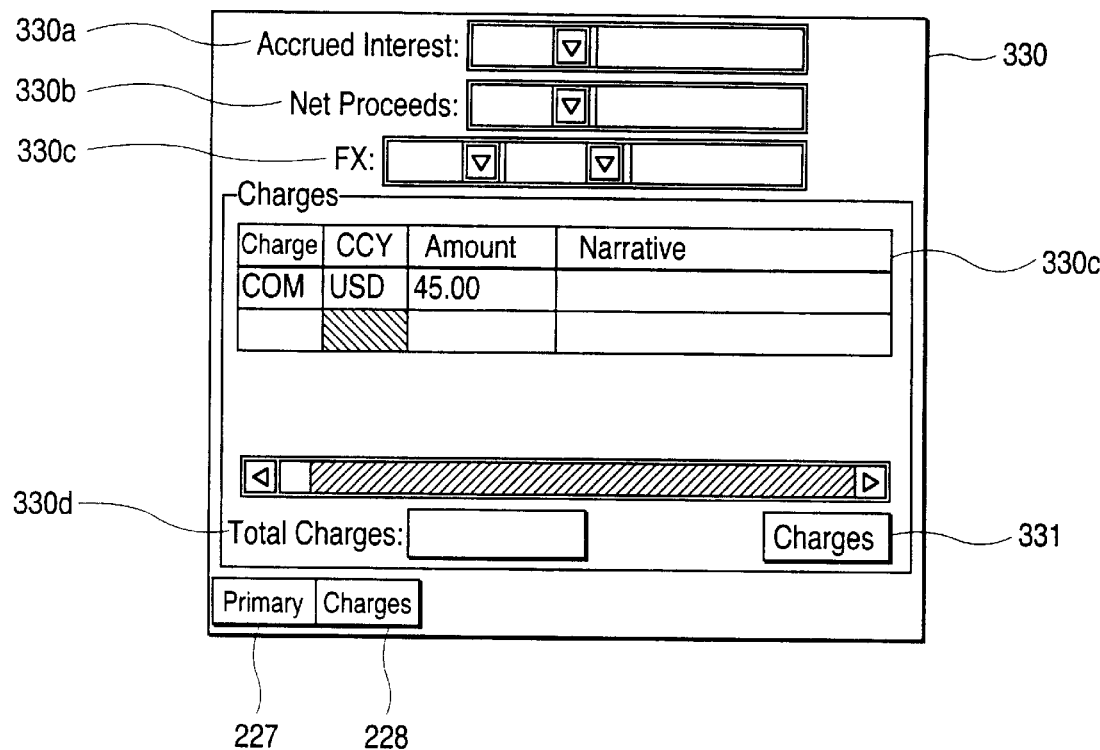
FIG. 12 presents the charges subpanel contained in the main screen for a GUI of an embodiment of the present invention.

As shown in FIG. 12, the charges dialogue box 330 is used to identify additional charges on the confirmation. The user enters accrued interest 330a, Net proceeds 330b, and FX information 330c. In FIG. 12, to enter FX rates on a securities confirmation 330c, when the confirmation currency is different from the settlement currency, the user must specify the exchange rate on the confirmation screen in the FX dialogue box. The first currency is the base currency and the second is the currency to which the exchange rate is to applied to obtain the base currency.

The user views in any additional charges in the dialogue box 330c. The dialogue box 330c also contains columns charge, CCY, amount, and narrative. The window 330 also includes total charges 330d. Additional charges information is added or edited by the user by selecting the charges button 331.

Figure 13:
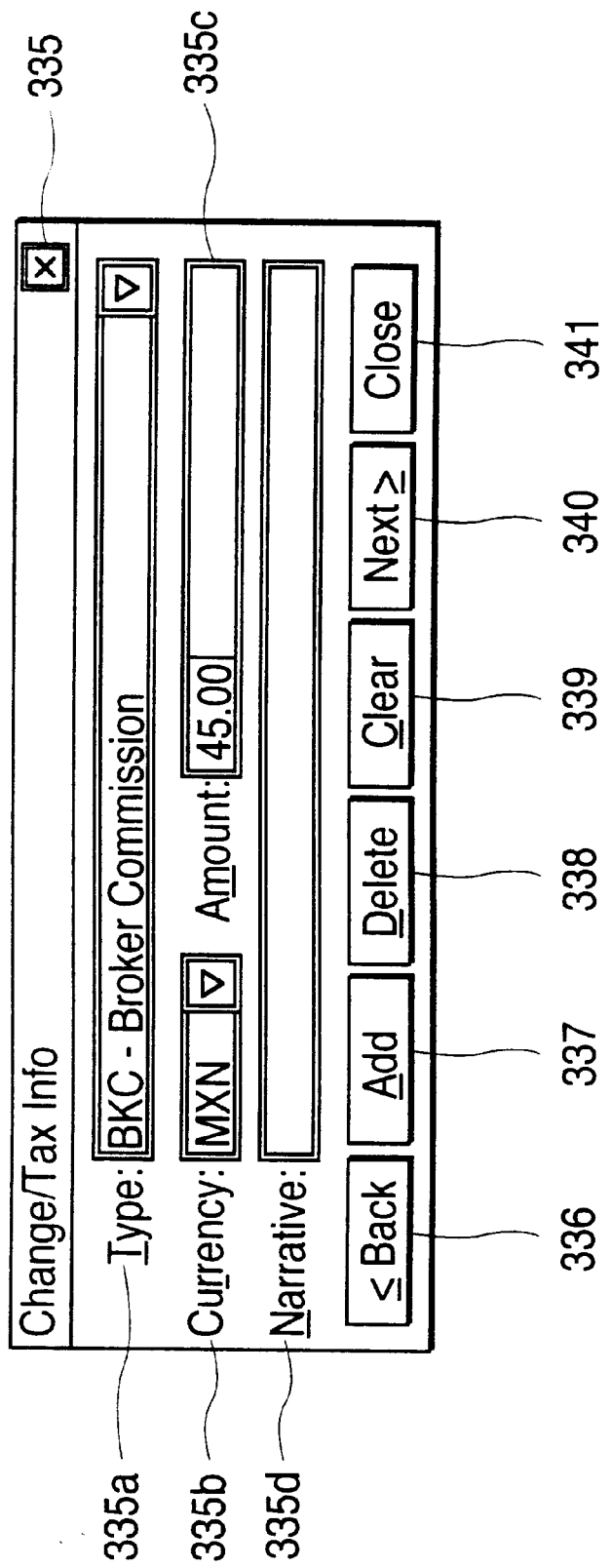
FIG. 13 is the charges popup window for the charges subpanel for a GUI of an embodiment of the present invention.

Selecting the charges button 331 in FIG. 12 produces the popup window 335, as shown in FIG. 13. The popup window 335 includes boxes for entering information on type 335a, currency 335b, amount 335c, and narrative 335d. The user can also use the menu buttons shown in the popup window 335. These menu buttons includes back 336, add 337, delete 338, clear 339, next 340, and close 341.

To view a summary of all confirmations, the user double clicks on the trade summary button 223 (FIG. 9). Clicking once on the selection button 224 allows the user to modify how they wish to view trades in the trade blotter and trade summary.

As shown in FIG. 14, the trade summary screen window 375 of an embodiment of the present invention for an example instrument type has the following buttons to make viewing confirmations easy: suggest 376, differences 377, refresh 378, and exit 379. Moving the cursor to any trade on the trade summary screen 375 and double clicking display the trade details.

To sort the confirmations, the user clicks on any of the column headings 375a–375m. These column heading correspond to fields, each column having lines of elements containing data. To cancel a confirmation, the user uses the mouse to select a confirmation from the trade blotter 220a.

Once the trade appears in the "ours" panel 221 on the main screen 220, the user clicks once on the cancel button 221d. The trade status 375d then changes to CANCELED. The user clicks once on the save button 221b (FIG. 9) to save the trade. (Note: the user can only cancel their own confirmations.) The user can only delete one of their confirmations before it has been sent to the counterparty. To delete a confirmation, the user selects the confirmation from the trade blotter. The confirmation then appears in the "ours" panel 221 (FIG. 9). The user clicks once on the cancel button 221d. The user is then prompted to verify that this is the confirmation that the user wants to delete. The user clicks once on the OK button to delete the confirmation. Once a confirmation has been sent to the counterparty, the user must cancel the confirmation.

To enter a confirmation, in the main screen 220 (FIG. 9), the user moves the cursor to the our tab 221 and clicks once. This activates the panel 221. The user uses the buy/sell selection 221e to specify whether the user has executed a buy or a sell, and then the user enters the required trade data and specifies the counterparty. The user then clicks once on the save button 221b to save the confirmation.

In order to reconcile unmatched trades, the user clicks on one confirmation in the trade summary. If the user clicks on the suggest button 376, an automatic search occurs for trades that potentially match. Clicking on the up and down arrows 380 increases or decreases, respectively, the number of fields that are used during the search.

Figure 15:
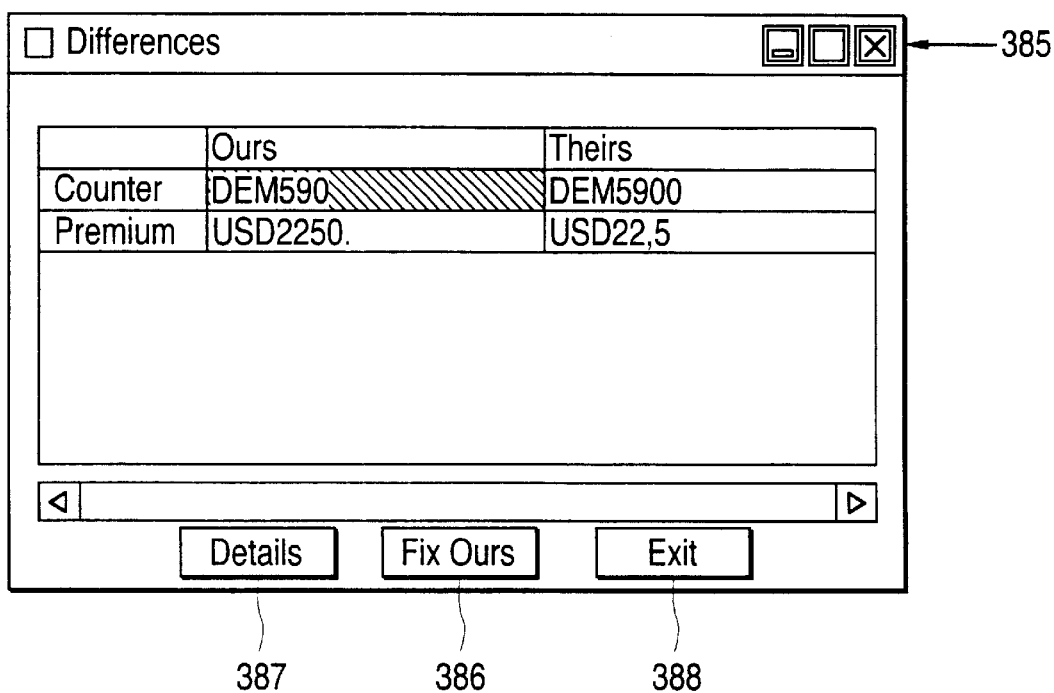
FIG. 15 provides the differences window for a GUI of an embodiment of the present invention.

Clicking on the differences button 377 in FIG. 14 displays the fields that are different between the two confirmations, as shown in the window 385 shown in FIG. 15. The user can automatically fix the confirmation by clicking on the fix "ours" button 386. Clicking on the details button 387 allows the user to manually correct the confirmation. Clicking on the exit button 388 removes the differences dialogue box.

Figure 16:
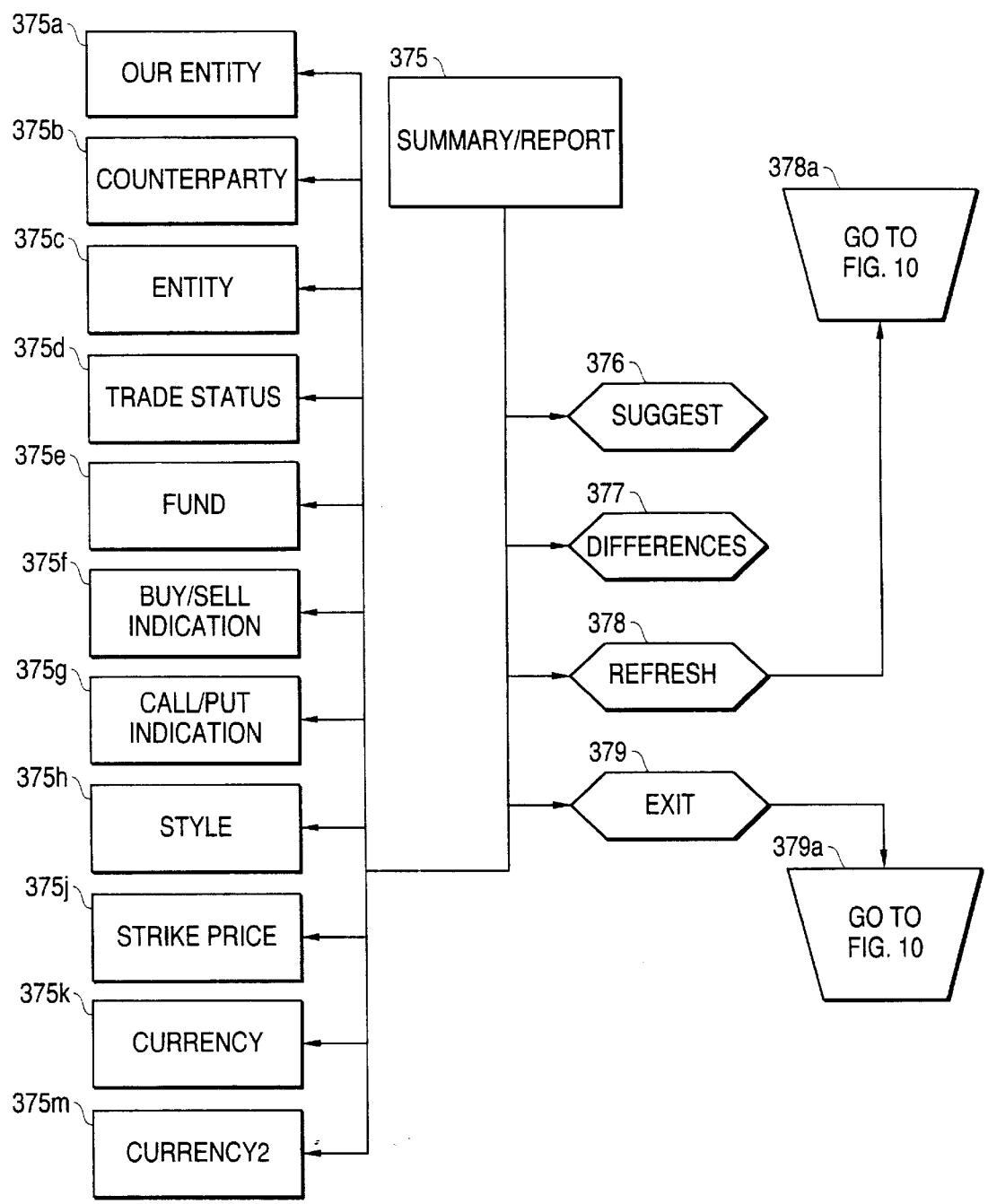
FIG. 16 contains a flow diagram of the functions of the summary/report screen for a GUI of an embodiment of the present invention.

FIG. 16 describes one use of the summary/report screen 375 shown in FIG. 14 and the differences screen shown in FIG. 15. The screen 375 includes our entity 375a, counterparty 375b, entity 375c, trade status 375d, fund 375e, buy/sell indication 375f, call/put indication 375g, style 375h, strike price 375j, currency 375k, and currency 375m. If the user selects refresh 378 the personal computer logs into the server 378a (see FIG. 10), and the information is updated.

If the broker selects exit 379, the screen exits 379a to the main screen (see 190 in FIG. 10). In addition, the broker can select a suggest button 376 to suggest a match. As discussed above, if the user selects the differences button 377, the differences screen 385 appears, as shown in FIG. 15 (see further description with regard to FIG. 15 above).

Figure 17:
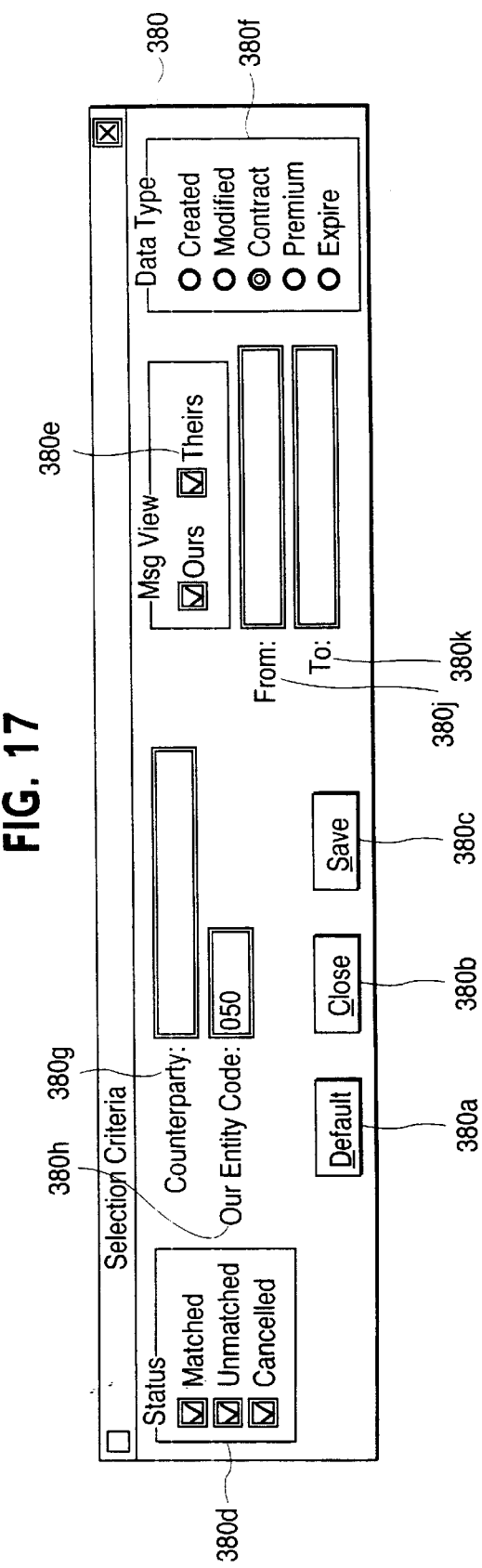
FIG. 17 depicts the selection criteria screen accessed through the main menu for a GUI of an embodiment of the present invention.

In FIG. 9, after the user selects the select button 224, a selection screen 380 appears, as shown in FIG. 17. The selection screen 380 is used to modify how the user views trades in the trade blotter and in the trade summary. The selection screen 380 has the following features to make viewing confirmations easy: buttons for default 380a, close 380b, and save 380c; toggle boxes for status 380d, msg view 380e, and data type 380f; and input boxes for counterparty 380g, our entity code 380h, from 380j, and to 380k. The counterparty input box 380g specifies the trade counterparty of the transaction. In an embodiment of the present invention, the 11 character SWIFT BIC code of the counterparty is entered in this field.

Figure 18:
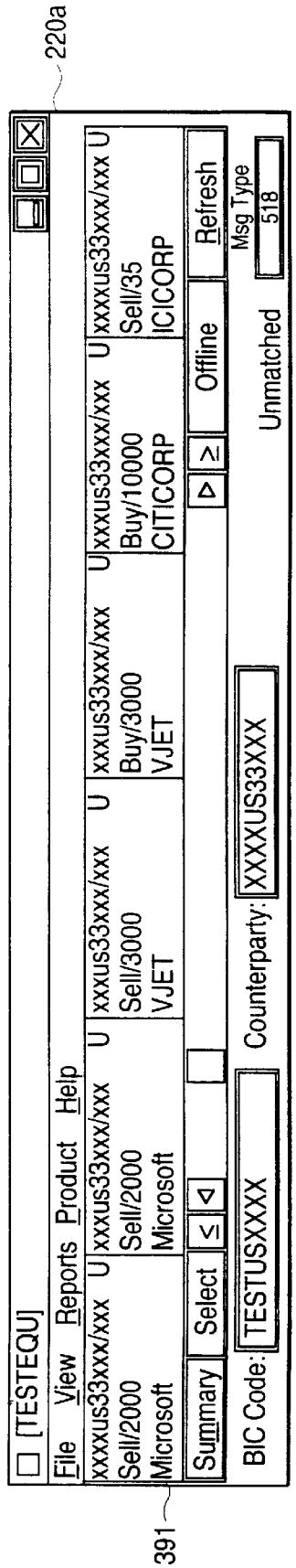
FIG. 18 depicts an example of the trade blotter used in the GUI of an embodiment of the present invention.

A closeup of the trade blotter screen 220a is presented in FIG. 18. The trade blotter screen 220a provides a quick view of the status of the user's confirmations. (See FIG. 19 below for more information regarding trade blotter information.)

To view an item on the trade blotter, the user moves the cursor to a trade 391 and double clicks. The selected item turns gray on the trade blotter and appears on the main window screen 220 (FIG. 9).

To change the trade blotter and trade summary view, as shown in FIG. 9, the user clicks on the select button 224 to display the selection dialog box 380 (see FIG. 17 above) or selects selection criteria from the view menu 151 (see FIG. 8). The selection dialogue window 380 (FIG. 17) appears with the default values already set. The user indicates whether they wish to see unmatched, matched, or canceled trades by checking the appropriate boxes in the status box 380d. The user can also select to view either all views of trades, a counterpart's views of trades or all views by checking the appropriate boxes in the msg view box 380e. The user can also select to view trades by a certain date by checking the appropriate boxes in the data type box 380f. The user clicks once on the save button 380c to complete the section setup. The user clicks once on the close button 380b to close the selection window 380.

Refreshing the trade blotter and trade summary screen sends all pending trades to the CMS server and retrieves all trades that have changed since the last time the user accessed the server. To refresh the screens, the user simply clicks the refresh button 226 (FIG. 9).

Figure 19:
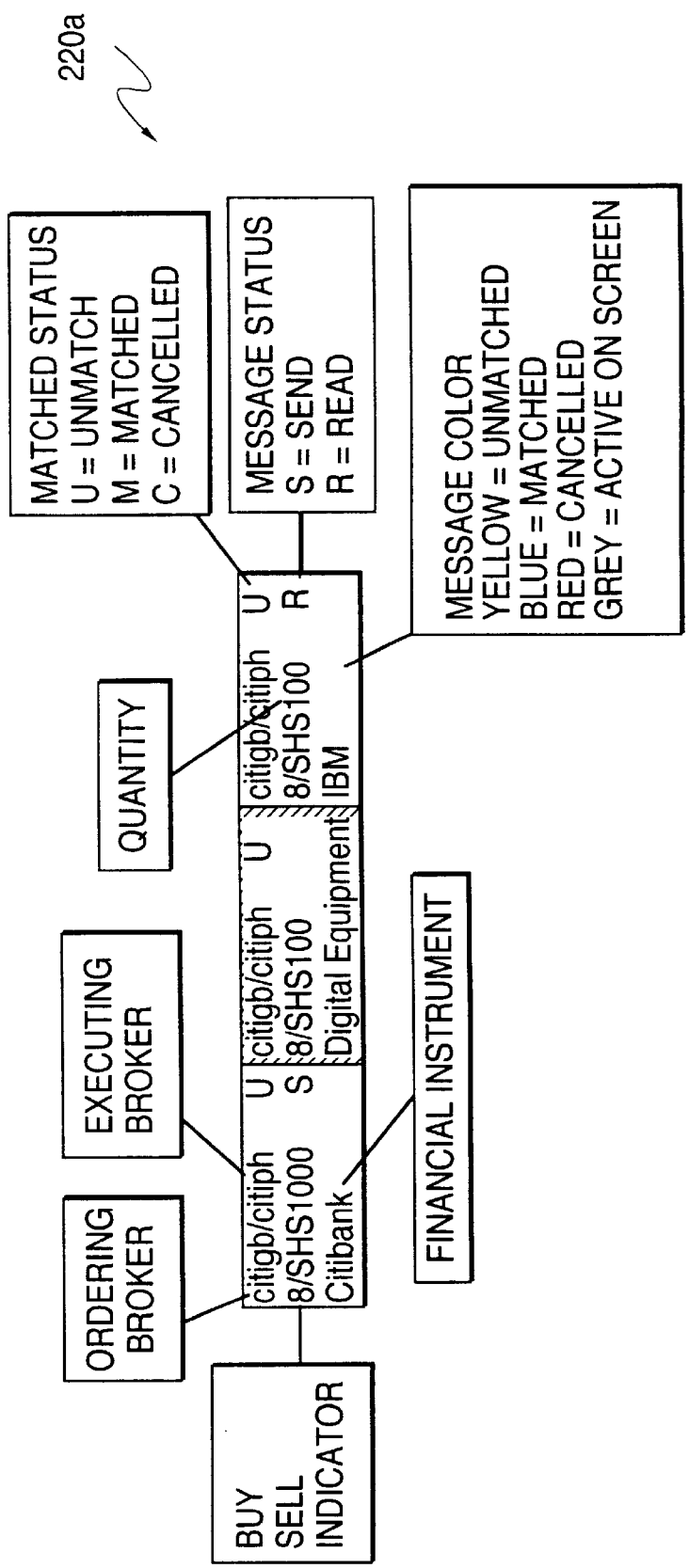
FIG. 19 contains information on various elements of the example trade blotter of FIG. 18.

FIG. 19 contains information on various elements of the example trade blotter screen 220a of FIG. 18. As shown in FIG. 19, the various elements of the trade blotter screen 220a include buy/sell indicator, ordering broker, financial instrument, executing broker, quantity, message color, matched status, and message status. With regard to message color (background of section), yellow indicates unmatched, blue indicates matched, red indicates canceled, and gray indicates active on screen. With regard to matched status, "U" indicates unmatched, "M" indicates matched, and "C" indicates canceled. With regard to message status, "S" indicates send and "R" indicates read.

The file 150 menu commands, as shown in FIG. 8, will now be further described. FIG. 8 presents the file 150 pull-down menu. The login to server (host) selection 161 allows the user to log into the server in order to enter, maintain, send, and retrieve data on the CMS server. The logoff selection 162 allows the user to logoff of the system. The change password selection 163 allows the user to change their password. The refresh all trades selection 164 allows the user to download all the confirmations that are active on the CMS server. Downloading all trades could take a while.

The import and export selections 166 and 167 allow the user to import data from their internal systems to the CMS workstation or to export data from the CMS workstation to their internal systems.

The printer setup selection 168 sets printer options before printing a topic. The user can select a printer and set or change options for the printer. The options available depend on the type of printer selected. The print screen selection 169 prints the screen that is displayed. The exit selection 170 quits CMS and saves any confirmations the user has created.

Figure 20:
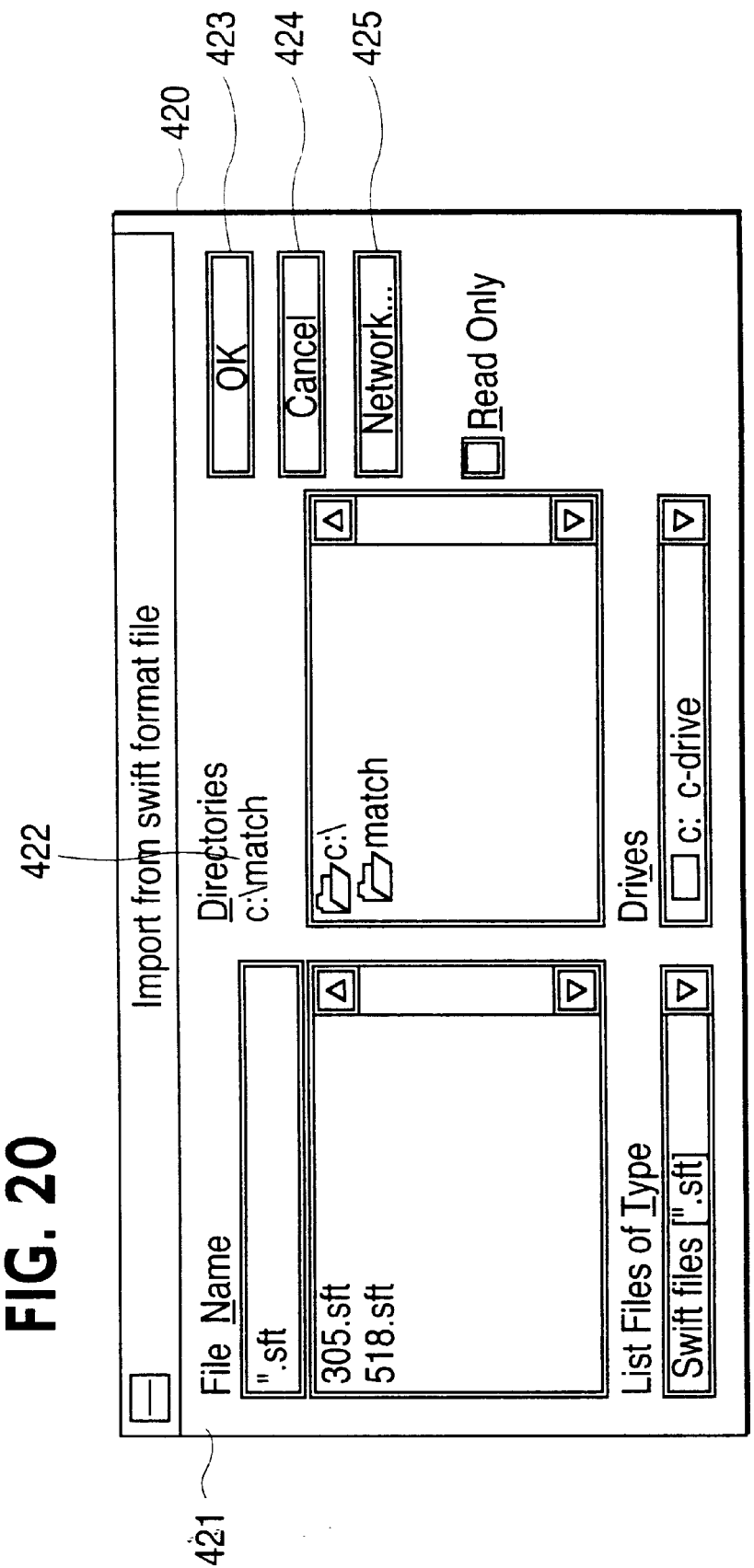
FIG. 20 shows the import file popup window for a GUI for an embodiment of the present invention.

To import and export files, the user selects either import 166 (FIG. 8) or export 167 from the file menu 150. The user selects either SWIFT format or Tab Delimited format from the submenu (not shown). The import/export dialog box 420 then appears, as shown in FIG. 20. The user selects the file name 421 and destination directory 422. The user clicks on the OK button 423 to execute the import or export command. The user may also select buttons to cancel 424 or access a network 425.

Figure 21:
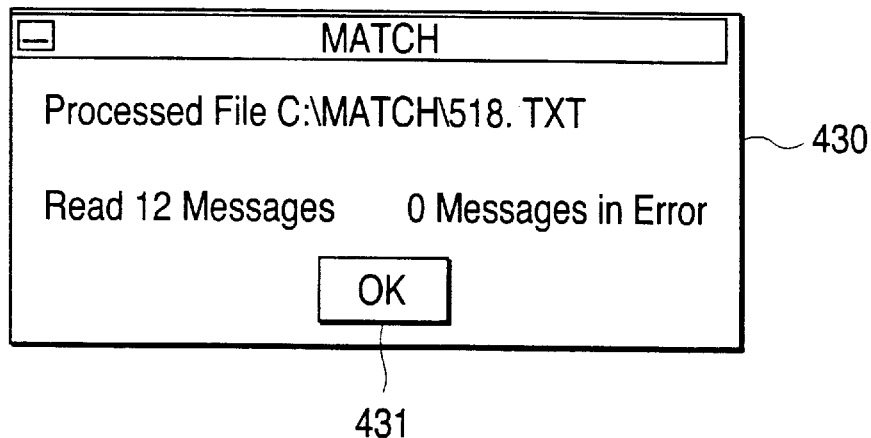
FIG. 21 is the match popup window for a GUI for an embodiment of the present invention.

Once the import or export has been completed, an import/export confirmation box 430 appears as shown in FIG. 21. The user clicks once on the OK button 431 to remove the dialogue box 430.

CMS is able to receive files that are generated from a user's in-house system in either a SWIFT format or a tab delimited format. Certain import file specifications apply to this data.

The user may confirm (quick match) a confirmation without entering view by selecting a counterpart's confirmation from the trade blotter. As shown in FIG. 9, the user clicks once on the "theirs" panel 222 to begin the quick match process. The "theirs" panel 435 then appears, as shown in FIG. 22. The user clicks once on the confirm button (not shown). In general, the quick matches are made in the following manner.

Figure 23:
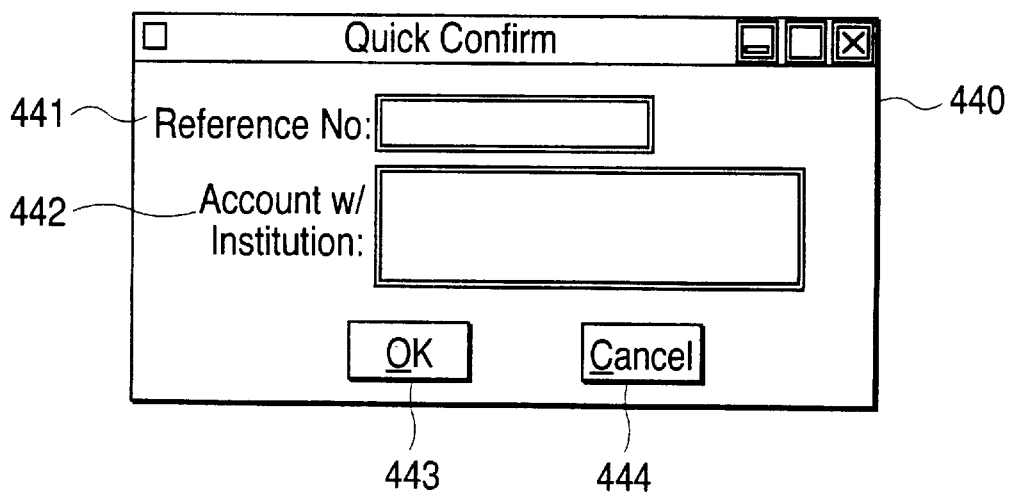
FIG. 23 presents the quick confirm popup window for a GUI for an embodiment of the present invention.

A quick confirmation dialogue box 440 then appears, as shown in FIG. 23. The user enters a transaction reference number 441 and settlement instructions 442 in the confirmation dialogue box. The user then clicks once on the OK button 443 and the confirmation is created. The user can also cancel the quick confirmation using the cancel button 444. When the user refreshes the trade blotter, the trade is matched at the server.

The reports function will now be described. The trade detail function prints a detail report of the current trade that is displayed on the screen. The trade summary function prints a report of all the confirmations that are currently displayed in the trade summary.

Figure 24:
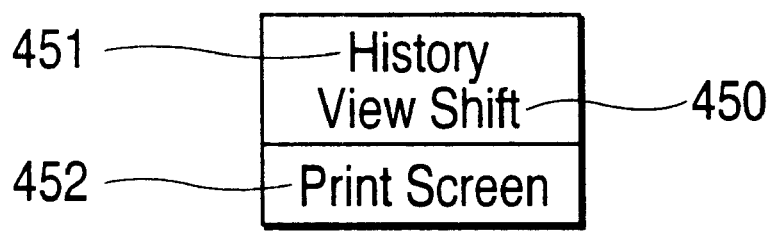
FIG. 24 is the trade history dialogue box for a GUI for an embodiment of the present invention.

To view the history of a trade, the user clicks once on the right mouse button. A popup window 450, as shown in FIG. 24, then appears. The user then clicks once on history 451 to display the trade history dialogue box. To remove the trade history dialogue box, the user clicks once on the OK button (not shown).

Figure 25:
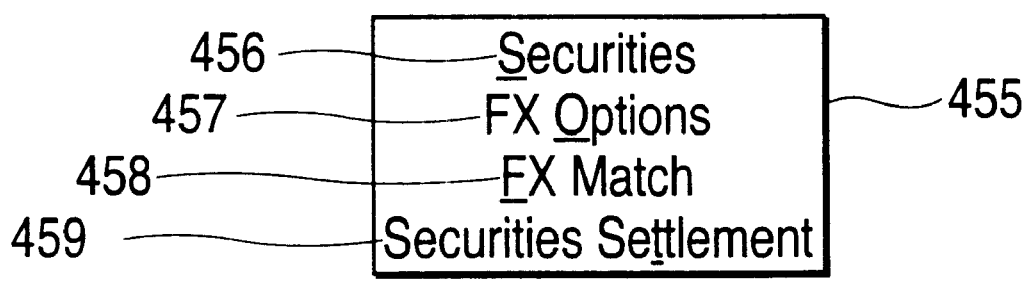
FIG. 25 shows the product pulldown menu for a GUI for an embodiment of the present invention.

If the user selects the products pulldown menu 153, as shown in FIG. 9, a pulldown menu 455 appears, as shown in FIG. 25. The product pulldown menu 455 includes securities 456, FX options 457, FX match 458, and securities settlement 459. Securities 456 allows the user to match securities confirmations. In an embodiment of the present invention, the securities product is based on the SWIFT standard MT518 messages. In embodiment of the present invention, this product is used for crossborder broker to broker sales and can be used for both equities and fixed income trades. An embodiment of the present invention includes additional products accessible via the products pulldown menu 153. These additional products include money markets, derivatives confirmation, and precious metals confirmation. Money markets uses MT320 SWIFT messages. Derivatives confirmation is based on SWIFT MT340 messages standards and is intended for FRA confirmations; this product is also usable for other types of derivative instruments. Precious metals confirmation is based upon the SWIFT MT600 message.

FX options 457 allows the user to make FX options trade confirmations. In an embodiment of the present invention, this product is based on the SWIFT305 message. FX match 458 allows the user to match FX confirmations. An embodiment of the present invention for FX match includes native SWIFT 97 format and completely removes distinctions between banks and non-banks so that the system is usable for bank to bank, bank to corporation, or corporation to corporation confirmations.

Securities settlement 459, as discussed further below with regard to FIGS. 27A–27D and 28, allows the user to send and confirm securities settlement instructions. In an embodiment of the present invention, securities settlement is based upon the MT520, MT521, MT522, MT523, and MT53X SWIFT messages. These messages are used to send a settlement notification to a clearing agent and to receive a confirmation back from the clearing agent. In an embodiment of the present invention, the securities product 456 for broker to broker securities confirmation allows the user to automatically generate an MT52X message to the clearing agent when the user has matched a deal, and upon any subsequent modification to that message.

Figure 26:
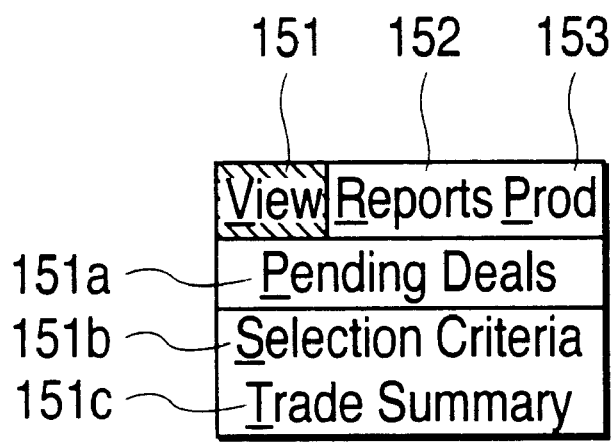
FIG. 26 presents the view pulldown menu for a GUI of an embodiment of the present invention.

The view menu pulldown menu 151 is shown in FIG. 26. The menu 151 includes pending deals 151a, selection criteria 151b, and trade summary 151c. Pending deals 151a allows the user to view any transactions pending on the server. Selection criteria 151b changes the criteria with which the user views the trade blotter and trade summary screen. Trade summary 151c accesses the trade summary screen.

Figure 27A:
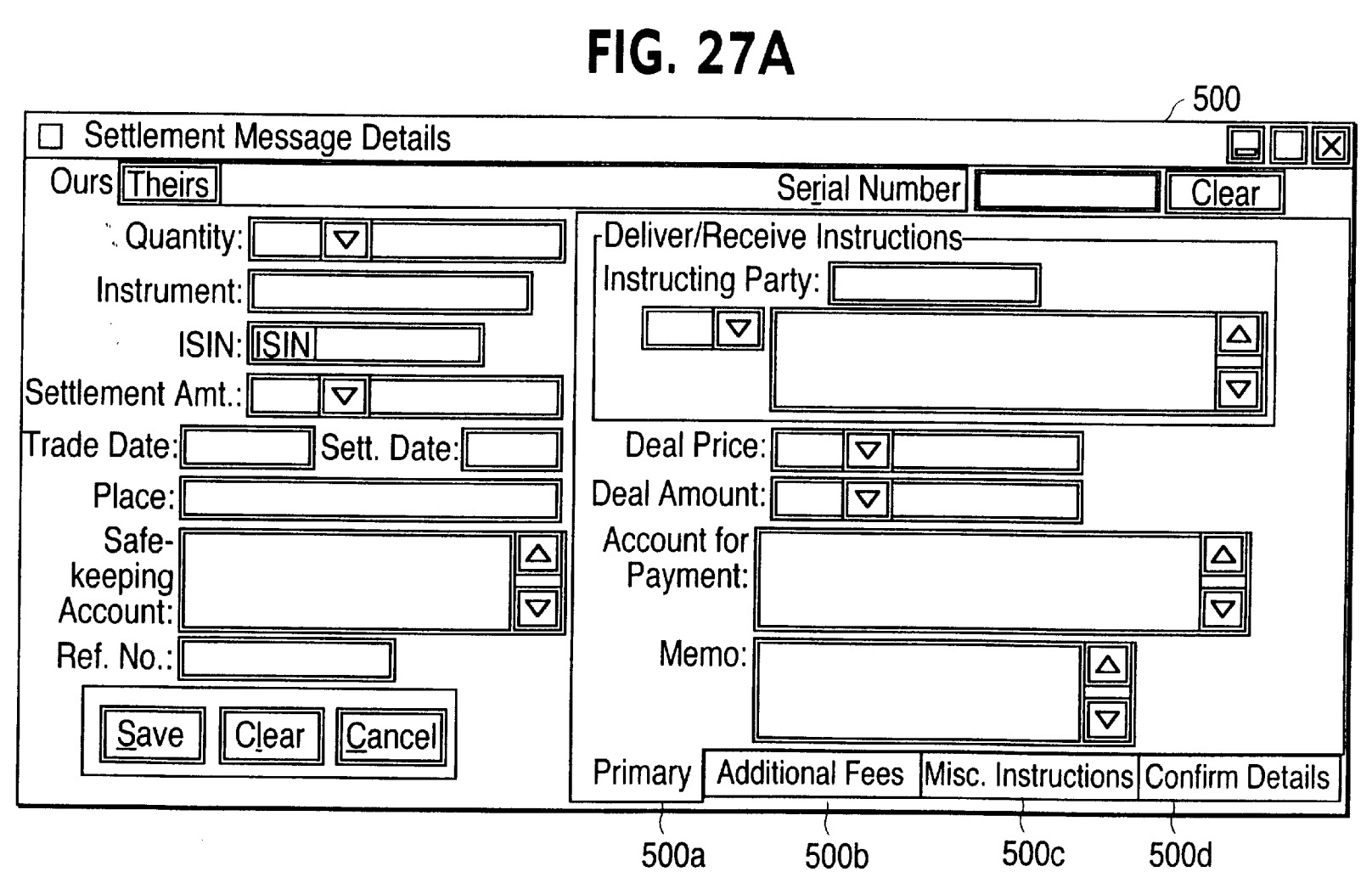
Figure 27D:
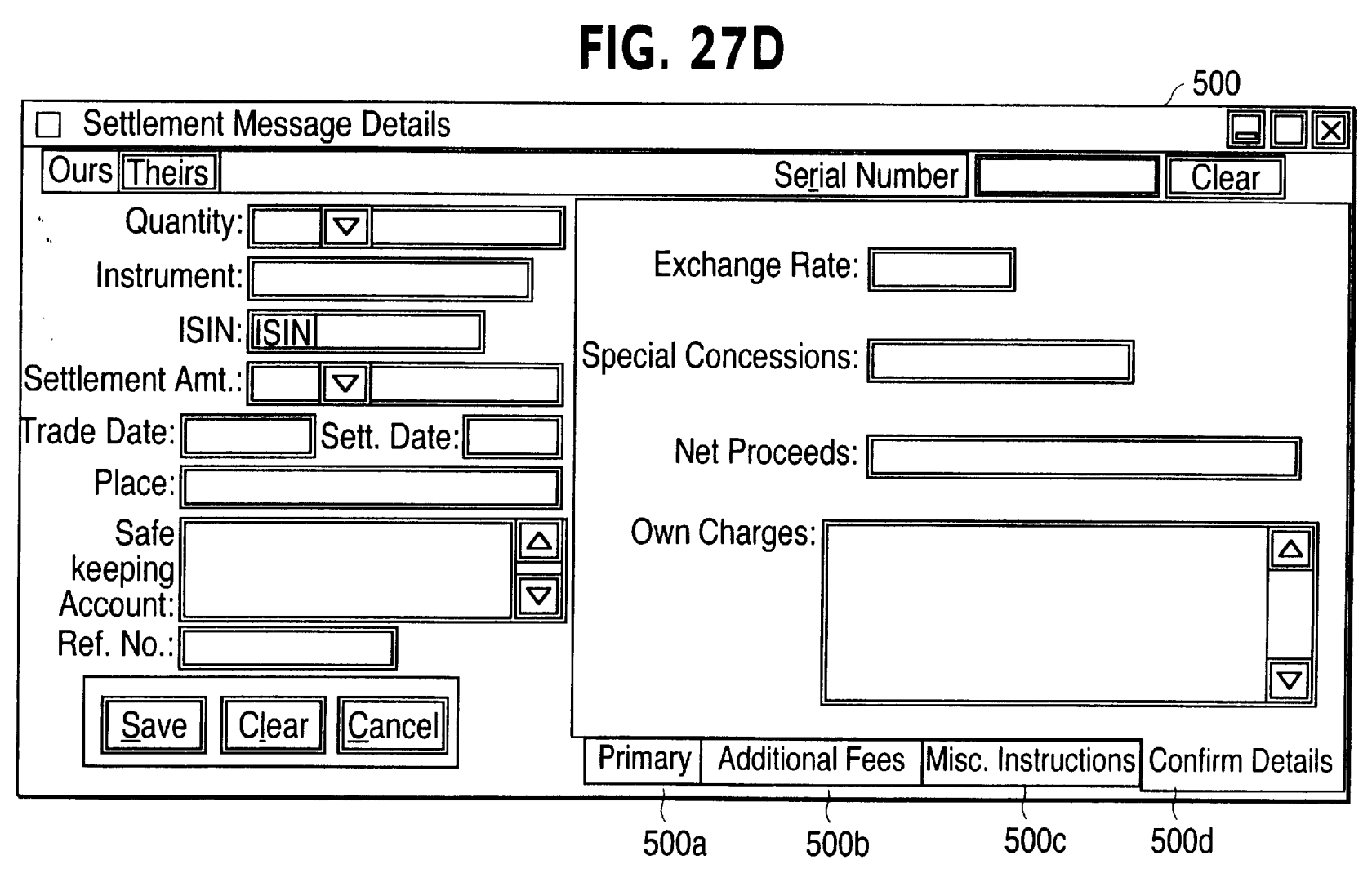

FIG. 27A presents a settlement instructions window 500 with the primary subwindow 500a presented for an embodiment of the present invention. This window 500 is accessed by the user via the securities settlement selection 459 in the products pulldown menu 155, shown in FIG. 25. FIG. 27B presents a settlement instructions window 500 with the additional fees subwindow 500b presented for an embodiment of the present invention. FIG. 27C presents a settlement instructions window 500 with the miscellaneous instructions subwindow 500c presented for an embodiment of the present invention. FIG. 27D presents a settlement instructions window 500 with the confirm details subwindow 500d presented for an embodiment of the present invention.

Figure 28A:
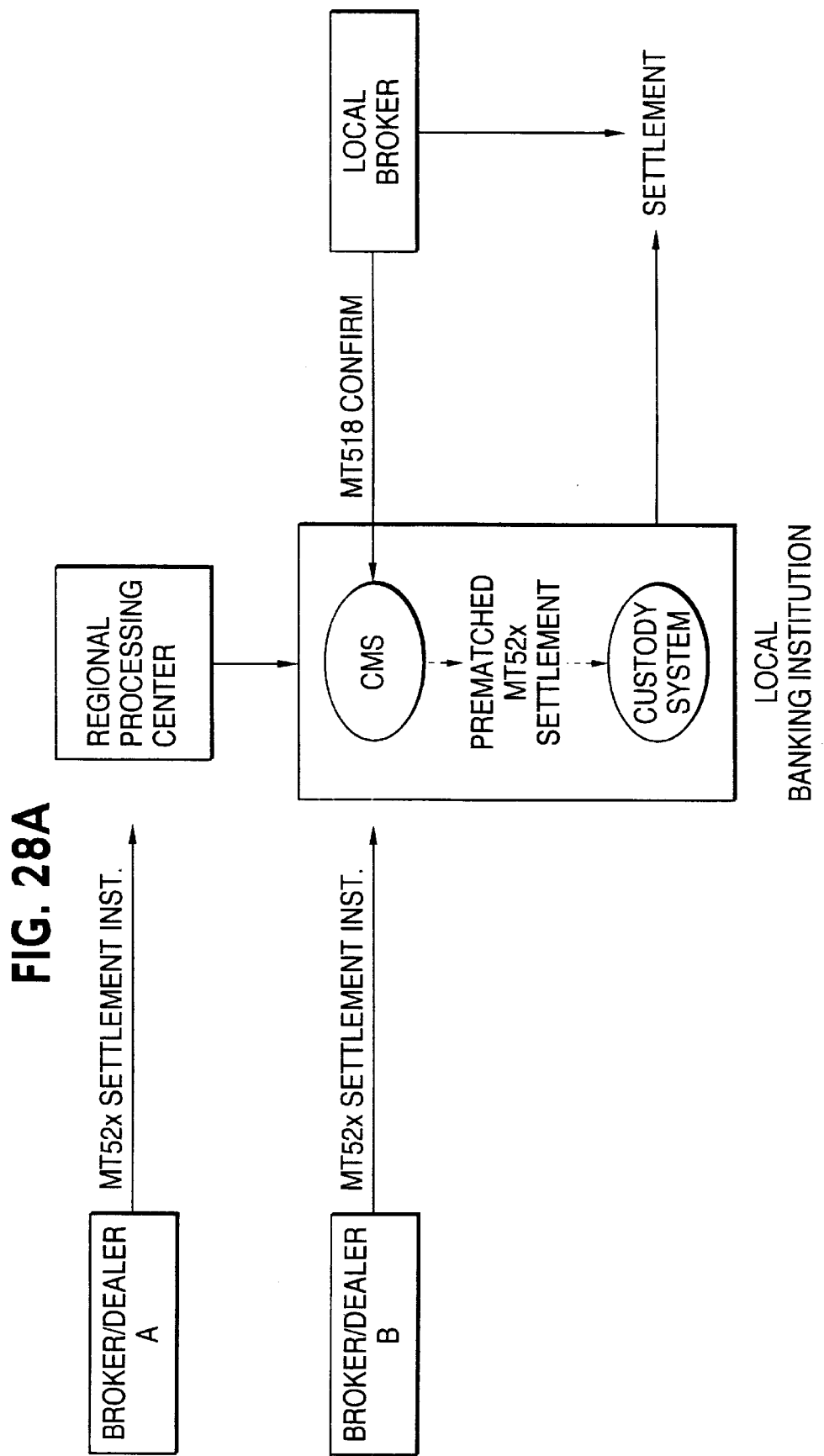
FIG. 28A contains an overview of a first scenario for trade settlement for an embodiment of the present invention.
Figure 28B:
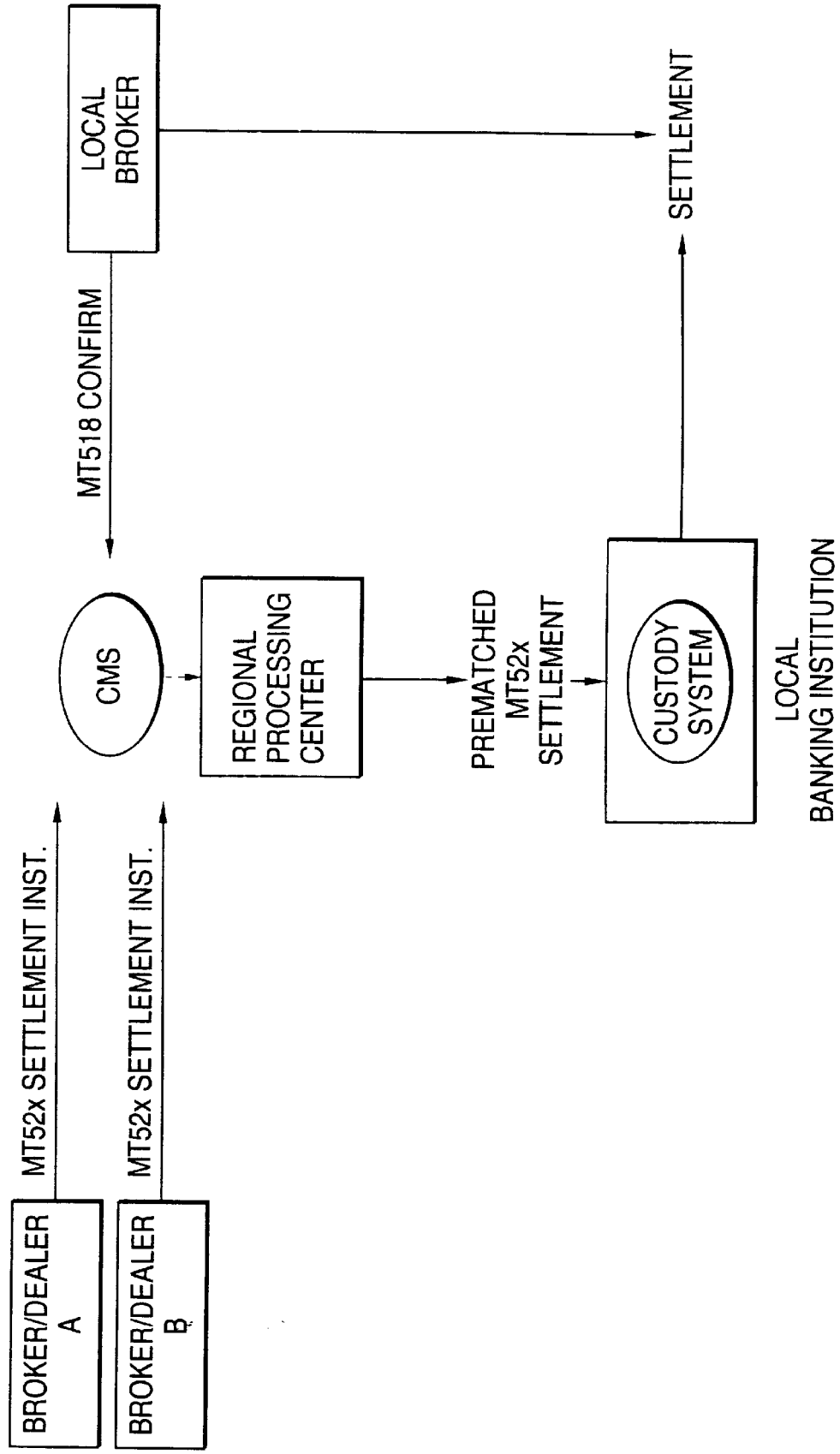
FIG. 28B is an overview of a second scenario for trade settlement for an embodiment of the present invention.

In an embodiment of the present invention, trade settlement occurs, for example, as shown in the two scenarios presented in FIGS. 28A and 28B. Once a trade has been executed between a broker/dealer and its local counterpart, the local counterpart enters the confirmation into CMS and sends the confirmation to the server. The broker dealer also enters the deal information into their local deal capture system and routes an MT52x settlement instruction to a banking institution. CMS receives MT52x settlement messages and attempt to match them to the local broker's trade confirmation message.

If the two transactions match, then CMS appends field 72 in the MT52x message with the code words /Matched/CrossMar, and forward the instruction to a regional processing center. The status of the local broker's confirmation changes from UNMATCHED to PREMATCHED. If the two transactions do not match, CMS appends the field 72 in the MT52x message with /CUNMATCH/CrossMar and with the appropriate status code(s) and forwards the instruction to the regional processing center. In this case, the status of the local broker's confirmation remains as UNMATCHED. Under no circumstances does CMS generate a new MT52x settlement instruction nor does CMS alter any data in the MT52x settlement message other than field 72.

In an embodiment of the present invention, there are instances where the local broker's confirmation reaches the server after the broker/dealer settlement instruction has passed through the server and has been forwarded to a custody system. CMS attempts to prematch the transaction, but does not forward the results to the banking institution in the form of an MT52x settlement instruction. The banking institution is, however, able to view the status of all transactions via the report feature in the GUI application.

Brokers/dealers and local brokers are able to view the status of their transactions via the report feature in the GUI application.

For an embodiment of the present invention, matching fields include the following: counterparty; security type and quantity; security code and description; trade date; settlement date; and settlement CCY and amount. In an embodiment of the present invention, CMS provides tables to translate local market codes to SWIFT codes for counterparty identification. In an embodiment of the present invention, matching rules include the following: MT52x settlements are matched with MT518 confirms; MT592 cancel settlements are only matched with previously Matched MT518 confirms; and amended confirms cannot break a matched settlement.

Matching scenarios for an embodiment of the present invention are illustrated in FIGS. 28C and 28D. Where the settlement message arrives after the confirm message, the table shown in FIG. 28C applies. When the confirm message arrives after the settlement message, the table shown in FIG. 28D applies.

FIG. 29 presents an example of a standing instructions screen for an embodiment of the present invention. In the window 550, the ordering broker specifies the trade date, the settlement amount, the settle date, the safekeeping account, the clearing agent, and the safekeeping type all within the settlement window. In addition, the ordering broker specifies the beneficiary of the instrument, the payment account, the beneficiary of money, the account for charges, and the registration details.

Figure 30:
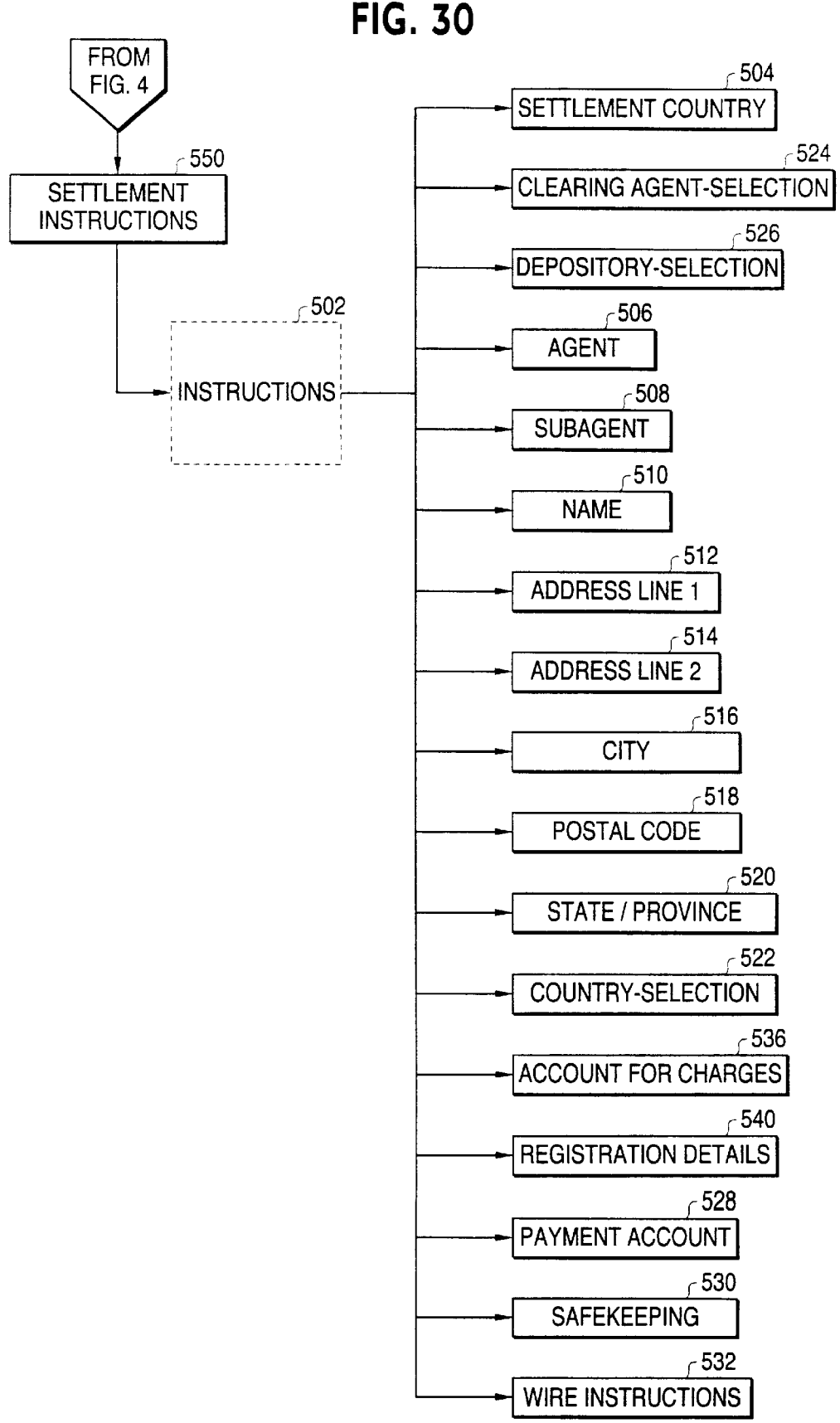
FIG. 30 shows a flow diagram of the functions of the standing instructions manager window for an embodiment of the present invention.

FIG. 30 describes the use of a settlement instructions window 550 for the embodiment of the present invention as described in FIG. 29. The window 550, which has a page for settlement instructions 502, contains fields for the settlement country 504, the agent 506, the subagent 508, the name 510, the first 512 and second 514 lines of address, the city 516, postal code 518 and the state or province 520. The country may be selected 522, as well as the clearing agent 524, and the depository 526. The broker may also enter the payment account 528, the safekeeping 530 and wire instructions 532, the account to be billed for charges 536, and registration details 540.

Embodiments of the present invention have now been described in fulfillment of the above objects. It will be appreciated that these examples are merely illustrative of the invention. Many variations and modifications will be apparent to those skilled in the art.

APPENDIX

Example data elements for example instrument types include the following:
FX Options
Counterparty
Buy/Sell
Call/Put
Style
Contract Date
Currency 1
Strike Price
Currency 2
Premium Date
Premium Price
Premium Amount
Expiry Date/Time
Settlement Type
Sender's Correspondent (for buying party)
Account with Institution
Securities
Counterparty
Buy/Sell
Quantity
Instrument
Price
Deal Amount
Settlement Amount
Trade Date
Settlement Date
Reference Number Further description of selected data elements is as follows. Deal amount specifies the ISO currency code and the total amount of the deal. It is equal to the confirmation price multiplied by the quantity of financial instruments. Instrument identifies the financial instrument in the transaction. An ISIN identifier is used when available. Price specifies the ISO currency code and the price of the deal as executed.

Quantity specifies the quantity of the financial instrument in the trade. The following codes are used to identify the type of instrument traded: 1) BON—Bonds; 2) CER—Representative Certificates; 3) CPN—Coupons; 4) FMT—Face Amount; 5) MSC—Miscellaneous; 6) OPC—Option Contracts; 7) OPS—Option Shares; 8) PRC—Premium Contracts; 9) PRS—Premium Shares; 10) RTE—Rentes; 11) RTS—Rights; 12) SHS—Shares; 13) UNT—Units; and 14) WTS—Warrants.

Settlement amount specifies the ISO currency code and the total amount of money to be received in exchange for financial instruments. Settlement date specifies the date on which the financial instruments and funds are to be exchanged. Optionally, this field may be used to indicate that settlement will take place at another specified place or date. If this is the case, one of the following codes may be used: 1) WIS—When Issued; 2) WDS—When Distributed; 3) WID—When Issued/When Distributed; or 4) SOP—Seller's Option. Trade date indicates the date on which the trade was executed.

GLOSSARY

Terms used in connection with various examples relating to an embodiment of the present invention may include one or more of the following. The list is not meant to be exclusive or to limit in any way the practice of the present invention.

"Account for charges" specifies the account(s) to be charged if it is different from the account for payment specified in the account for payment field.

"Account for payment" identifies the ordering broker's cash account, serviced by the executing party and from which payment is to be made in a buy order or to which payment is to be made in a sell order.

"Account with institution" indicates the institution to which payment is to be made in favor of the beneficiary of money.

"Accrued interest" specifies the ISO currency code and the amount of accrued interest to be added or deducted.

"Attribute" further defines the financial instrument by specifying an attribute. In relation to attribute, a code word may be selected from the following: 1) CFI—the ISO classification of the financial instrument code followed by the six digit code; 2) CPD—the next coupon date followed by a date in a YYYYMMDD form; 3) CPN—the next coupon number followed by the number; 4) CTN—certificate numbers followed by the code MSG579 (meaning an MT579 will follow); 5) CUP—Covered or Uncovered Position Indicator followed by C for covered or U for Uncovered; 6) MDC—maturity date of the contract; 7) MDD—maturity date of the debt instrument followed by the date in the YYYYMMDD form; 8) MSC—other attribute followed by a short description; 9) OPS—option style followed by A for American or E for European; 10) OPT—option type followed by P for put option or C for call option; 11) SKP—strike price followed by the strike price; 12) VNO—version number of the contract of tranches followed by the number.

"Beneficiary of financial instruments" is used to specify in a order to buy if the financial instruments, once delivered to the clearing agent, are to be deposited in favor of another party or account. This field should not be used in a sell transaction.

"Beneficiary of money" identifies the account to be credited with the proceeds of the sale.

"Buy/sell indicator" is used to specify if an order or execution is to buy or sell. "Charge narrative" is used to further explain the charges in charges dialogue box.

"Charges" dialogue box is used to identify additional charges on the execution. Use this feature to enter commissions, taxes, stamp duty, exchange fees, postage, shipping fees, and any other additional charges.

"Clearing agent" is used to identify both the type of clearing arrangement and the settlement agent used for clearing transactions. One of the following codes may be specified in relation to a clearing agent: 1) APMT—delivery is made against payment; or 2) FREE—delivery is made free. The recommended format for entering settlement instructions is: the first line is the account number at the clearing agent and the second line is the clearing agent's SWIFT BIC code.

"Commission" specifies the commission agreed between the ordering broker and the executing party.

"Commission basis" specifies the basis for the commission indicated in the commission field. One of the following codes can be selected: 1) P—the commission is per unit of the financial instrument; 2) F—the commission is a flat fee; 3) O—the commission is a percentage of the broker's commission.

"Conditions" specifies an additional transaction or trade condition. One of the following code words may be selected with regard to conditions: 1) AIB—accrued interest calculation basis; 2) BLK—block order; 3) BST—best confirmation price indicator, followed by a Y for yes or an N for no; 4) CBK—commission sharing broker; 5) CBN—trade executed cum bonus; 6) CCP—trade executed cum coupon; 7) CDV—trade executed cum dividend; 8) CRS—cross trade indicator, followed by a Y for yes or an N for no; 9) CSA—commission sharing agent; 10) CSB—commission sharing basis; 11) FRC—free clean settlement; 12) GDL—trade executed with guarantee delivery; 13) MSC—miscellaneous; 14) NTP—net price; 15) POS—position; 16) SDL—trade executed with a special delivery; 17) SDT—requested settlement date; 18) SEM—trade executed by a stock exchange member; 19) SLC—trade executed in a special location; 20) SRO—trade executed under rules of the self regulatory organization; 21) XBN—trade executed ex bonus.; 22) XCP—trade executed ex coupon; and 23) XDV—trade executed ex dividend.

"Counterparty" specifies the trade counterparty of the ordering broker.

"Country" identifies the country where settlement of the transaction will occur. The ordering broker may specify the two character ISO country code on the order.

"Country code" is used to specify the country where settlement is to occur. The two character ISO country code may be entered.

"Created" is the date the confirmation was created.

"Deal amount" specifies the ISO currency code and the total amount of the deal. It is equal to the execution price multiplied by the quantity of financial instruments.

"Dealing capacity" identifies the role of the executing party. The following code words may be selected: 1) AGEN—the executing broker acted as an agent; 2) CROS—the executing broker executed both sides of the trade; and 3) PRIN—the executing broker acted as principal.

"Executing broker" indicates the executing party to which an order has been submitted or executed.

"Instrument" identifies the financial instrument in the transaction. An ISIN identifier should be used when available.

"Net proceeds" specifies the ISO currency code and net amount after charges/taxes to be credited to the seller.

"Ordering Broker" indicates the initiator of an order to buy or sell securities.

"Place of trade" indicates where the order is to be executed. One of the following codes may be selected: 1) OTC—over the counter; 2) PRM—primary market; 3) EXC—stock exchange; and 4) MSC—other place of trade.

"Price" specifies the ISO currency code and the price of the deal as executed.

"Price Limit" specifies the currency, price limit and code identifying the type of order. The field includes an ISO currency code, a price and a price limit code.

"Price Limit Codes" are codes used to buy or sell orders, and include the following: AON—all or none; BCE—buy contra short exempt; BCS—buy contra short; BMI—buy minus; CAR—carefully; COM—combination order; DNI—do not increase; DNR—do not reduce; DSC—discretionary; FOK—fill or kill; LMT—limit order; LWO—limit with or without a round lot sale; MIT—market until touched; MKT—at the market; MNH—market not held; MSC—miscellaneous; NHD—not held; ORL—order lie; SEI—sell short exempt; SLO—stop loss; SPS—sell plus; SSI—sell short; STL—stop limit; and STP—stop order.

"Price limit qualifier" is used to specify whether the price limit used in the price limit filed and or the stop price is a discount or premium amount or a par value. The following code words may be selected: CEN—the price or stop limit is less than a dollar; DIS—the price or stop price limit is a discount amount or percentage relative to the issue price; PAR—the price or stop price limit is a par value or equal to the nominal or face value of the instrument; and PRE—the price or stop price limit is a premium amount or percentage relative to the issue price.

"Price type" is used to specify if the price is a discount or premium amount or another type of price. One of the following codes may be used: 1) CEN—the price is less than a dollar; 2) DIS—the price is a discount or percentage relative to the issue price; 3) PRE—the price is a premium amount or percentage to the issue price; or 4) PAR—the price is a par value or equal to the nominal or face value of the instrument.

"Quantity" specifies the quantity of the financial instrument in the trade. The following codes may be included to identify the type of instrument: BON—bonds; CER—representative certificates; CPN—coupons; FMT—face amount; MSC—miscellaneous; OPC—option contracts; OPS—option shares; PRC—premium contracts; PRS— premium shares; RTE—rentes; RTS—rights; SHS—shares; UNT—units; and WTS—warrants.

"Receiver of cash" is used to identify the party to which to be ultimately delivered or which holds the financial instruments when other than the clearing agent. The first line is the account number at the clearing agent and the second line is the clearing agent's SWIFT BIC code.

"Receiver/deliverer of financial instruments" is used to identify the party to which to be ultimately delivered or which holds the financial instruments when other than the executing party. The following codes are included for an embodiment of the present invention: APMT—delivery is made against payment; and FREE—delivery is made free.

"Registration details" identifies the party whose name the financial instruments are to be registered. This field may also contain the instruction not to re-register.

"Reporting instruction" is used to specify a reporting or processing instruction. One of the following codes may be used in an embodiment of the present invention: DDO—directed order; or DOR—direct order.

"Routing indicator" indicates whether the order is to be routed to an order routing application or to a specific party. The following code words may be selected: AOR—used to direct an order to an automatic order routing service; and ATT—used to direct the order to attention of a specific party.

"Safekeeping account" identifies the ordering broker's safekeeping account serviced by the executing party.

"Safekeeping type" identifies the type of safekeeping. One of the following codes may be selected: 1) ABR—the financial instruments are held abroad; 2) CEN—centralized domestic book-entry; 3) MSC—other type of safekeeping, followed by a short description; or 4) PHY—physical domestic safekeeping.

"Security type" is designated on the order to identify the type of financial instrument is used in conjunction with the country to retrieve the corresponding settlement instructions from the standing delivery instructions database. One of the following codes must be entered on the order: EQU—equity; FIN—fixed income; FUT—futures; MIS—miscellaneous; and OPT—options.

"Sender to receiver information" is used to supply additional information and is to be used only when no other field is available for this information.

"Settlement amount" specifies the ISO currency code and the total amount of money to be received in exchange for the financial instruments.

"Settlement date" specifies that date on which the financial instruments and funds are to be exchanged. Optionally, this field may be used to indicate that settlement will take place at another specified place or date. If this is the case, then one of the following codes may be used for an embodiment of the present invention: WIS—when issued; WDS—when distributed; WID—when issued/when distributed; and SOP—seller's option.

"Standing instructions override indicator" when checked indicates that standing instructions contained in the standing instructions database are to be overridden.

"Status codes" identifies the status of an order or confirmation. The following three status codes may be included: 1) CANCELED—indicates that the confirmation has been canceled; canceled transactions appear in the trade blotter in red; 2) MATCHED—indicates that the confirmation has been matched; matched transactions appear in the trade blotter in blue; and 3) UNMATCHED—indicates that the confirmation has not been matched by its counterparty; unmatched transactions appear in the trade blotter in yellow.

"Stop price" is used when a price limit has been specified in the Price Limit field. The following code words may be selected: PCT—followed by the percentage price; REN—followed by a revenue amount; and YLD—followed by a yield price.

"Time limit" contains a code indicating the time limit or the date on which the order is to expire; or both. One of the code words may be selected: CLO—at the closing; DAY—good for the day; GTC—good until canceled; GTE—good until executed; GTM—good for the month; GTD—good through a date; GTX—good until crossed; IOC—immediate or cancel; and OPN—at the open.

"Trade date" indicates the date on which the order was executed.

What is claimed is:

1. A method for a first user to identify matching pairs of predetermined financial transactions for the first user and a second user, comprising:

the first user transmitting at least one set of data for at least one predetermined financial transaction for the first user from a first terminal to a server, wherein each predetermined financial transaction for the first user has a corresponding set of data and a corresponding set of summary data;

the first terminal automatically displaying a first combined summary set, wherein the first combined summary set comprises a combination of each of the corresponding sets of summary data for each predetermined financial transaction for the first user;

the first terminal automatically providing an option to display the corresponding set of data for a selected predetermined financial transaction;

the second user transmitting a second set of data for at least one predetermined financial transaction for the second user from a second terminal to the server, wherein each predetermined financial transaction for the second user has a corresponding set of data and a corresponding set of summary data;

the server automatically transmitting to the first terminal the second set of data for at least one predetermined financial transaction for the second user;

the first terminal automatically displaying a second combined summary set, wherein the second combined summary set comprises a combination of the first combined summary set and a combination of each of the corresponding sets of summary data for each predetermined financial transaction for the second user;

the first terminal automatically providing an option to display the corresponding set of data for a selected predetermined financial transaction for the second user, wherein the first user may toggle between the display of the corresponding set of data for the selected predetermined financial transaction for the first user and the display of the corresponding set of data for the selected predetermined financial transaction for the second user;

the first terminal automatically providing an option to select at least two summary sets from the combined set of summary sets for matching predetermined financial transactions;

the first terminal automatically providing an option to select to identify automatically matching pairs of predetermined financial transactions, wherein each matching pair includes a first pair half comprising at least one predetermined financial transaction for the first user having a first pair half data set, and a second pair half comprising at least one predetermined financial transaction for the second user having a second pair half data set, the first pair half and the second pair half matched by matching the first pair half data set and the second pair half data set;

selecting the option to select to identify automatically matching pairs of predetermined financial transactions; and automatically matching pairs of predetermined financial transactions.

2. The method of claim 1 wherein predetermined financial transactions comprise at least one transaction selected from the group of securities, foreign exchange, money markets, and derivatives.

3. The method of claim 1 further comprising:

automatically providing an option to quick match pairs of predetermined financial transactions;

selecting the option to quick match pairs of predetermined financial transactions; and automatically quick matching pairs of predetermined financial transactions.

4. The method of claim 3 wherein automatically providing an option to quick match pairs of predetermined financial transactions further comprises:

selecting the option to display the corresponding set of data for the selected predetermined financial transaction for the second user;

confirming the selection of the option to display the corresponding set of data for the selected predetermined financial transaction for the second user;

inputting a set of quick confirmation instructions; and automatically quick matching the set of data for the selected predetermined financial transaction for the second user to a matching predetermined financial transaction for the first user.

5. The method of claim 4 wherein the set of quick confirmation instructions includes a transaction reference number.

6. The method of claim 4 wherein the set of quick confirmation instructions includes an account identifier.

7. The method of claim 1 further comprising:

the first user selecting a first predetermined financial transaction;

automatically presenting the first user with an option to view a history for the first predetermined financial transaction, the history including a list of selected matching predetermined financial transactions corresponding to the second pair half for the predetermined financial transaction matching the first predetermined financial transaction; and if the first user selects the option to view a trade history, automatically presenting the first user with the history for the first predetermined financial transaction.

8. A method for identifying matching pairs of predetermined financial transactions, comprising:

receiving at least one set of data for at least one first predetermined financial transaction, wherein each of the at least one first predetermined financial transaction has a corresponding set of data and a corresponding set of summary data;

automatically displaying a first combined summary set, wherein the first combined summary set comprises a combination of each of the corresponding sets of summary data for each of the at least one first predetermined financial transaction;

automatically providing an option to display the corresponding set of data for a selected predetermined financial transaction;

receiving a second set of data for at least one second predetermined financial transaction, wherein each of the at least one second predetermined financial transaction has a corresponding set of data and a corresponding set of summary data;

automatically transmitting the second set of data for the at least one second predetermined financial transaction;

automatically displaying a second combined summary set, wherein the second combined summary set comprises a combination of the first combined summary set and a combination of each of the corresponding sets of summary data for each of the at least one second predetermined financial transaction;

automatically providing an option to display the corresponding set of data for the at least one second predetermined financial transaction, wherein the display may be toggled between the display of the corresponding set of data for the at least one first predetermined financial transaction and the display of the corresponding set of data for the at least one second predetermined financial transaction;

automatically providing an option to select at least two summary sets from the combined set of summary sets for matching predetermined financial transactions;

automatically providing an option to select to identify automatically matching pairs of predetermined financial transactions, wherein each matching pair includes a first pair half comprising the at least one first predetermined financial transaction having a first pair half data set, and a second pair half comprising the at least one second predetermined financial transaction having a second pair half data set, the first pair half and the second pair half matched by matching the first pair half data set and the second pair half data set;

selecting the option to select to identify automatically matching pairs of predetermined financial transactions; and automatically matching pairs of predetermined financial transactions.

9. The method of claim 8, wherein predetermined financial transactions comprise at least one transaction selected from the group of securities, foreign exchange, money markets, and derivatives.

10. The method of claim 8, further comprising:

automatically providing an option to quick match pairs of predetermined financial transactions;

selecting the option to quick match pairs of predetermined financial transactions; and automatically quick matching pairs of predetermined financial transactions.

11. The method of claim 10, wherein automatically providing an option to quick match pairs of predetermined financial transactions further comprises:

selecting the option to display the corresponding set of data for the at least one second predetermined financial transaction;

confirming the selection of the option to display the corresponding set of data for the at least one second predetermined financial transaction;

inputting a set of quick confirmation instructions; and automatically quick matching the set of data for the at least one second predetermined financial transaction to a matching one of the at least one first predetermined financial transaction.

12. The method of claim 11, wherein the set of quick confirmation instructions includes a transaction reference number.

13. The method of claim 11, wherein the set of quick confirmation instructions includes an account identifier.

14. The method of claim 8, further comprising:

receiving a selection of a first predetermined financial transaction;

automatically presenting an option to view a history for the first predetermined financial transaction, the history including a list of selected matching predetermined financial transactions corresponding to the second pair half for the at least one second predetermined financial transaction matching the first predetermined financial transaction; and if the option to view a trade history is selected, automatically presenting the first user with the history for the first predetermined financial transaction.

15. A method of matching a plurality of predetermined financial transactions for a plurality of users, wherein each of the plurality of predetermined financial transactions is conducted using a transaction currency, and wherein data for the plurality of predetermined financial transactions are categorized into at least one field of a plurality of fields such that data is contained in a total number of fields, and wherein the plurality of users includes at least a first user and at least a second user, comprising:

initiating a communication link between the first user and a server;

initiating a communication link between the second user and the server;

the first user selecting at least one predetermined financial transaction;

the second user selecting at least one predetermined financial transaction;

selecting a number of fields for obtaining matching, wherein the number of fields is not greater than the total number of fields;

automatically identifying matching pairs of predetermined financial transactions, wherein each matching pair includes a first pair half comprising a first predetermined financial transaction for the first user, and a second pair half comprising a second predetermined financial transaction for the second user, and wherein the first pair half and the second pair half are within the selected number of fields;

automatically providing an option to the first user to generate a summary report; and if the user selects the option to generate the summary report, automatically generating the summary report;

wherein the summary report includes at least two fields, each of the fields including a set of elements and a set of data further comprising:

the first user selecting from the at least two fields a first field containing a first set of elements and a set of data;

automatically providing an option to suggest matches for the field;

if the first user selects the option to suggest matches for the field, automatically searching a second set of elements for a second field; and automatically identifying a set of data for which the set of elements for the second field matches the set of data for the first field.

16. The method of claim 15 further comprising:

automatically presenting the first user with an option to select a set of fields to display, the set of fields comprising not more than the at least two fields; and if the first user selects the option to select the set of fields, automatically providing the first user with a group of selections corresponding to the fields comprising the set of fields; and the user selecting from the group of selections such that the set of fields comprises fields corresponding to the group of selections.

17. A method of matching a plurality of predetermined financial transactions for a plurality of users, wherein each of the plurality of predetermined financial transactions is conducted using a transaction currency, and wherein data for the plurality of predetermined financial transactions are categorized into at least one field of a plurality of fields such that data is contained in a total number of fields, and wherein the plurality of users includes at least a first user and at least a second user, comprising:

initiating a communication link between the first user and a server;

initiating a communication link between the second user and the server;

the first user selecting at least one predetermined financial transaction;

the second user selecting at least one predetermined financial transaction;

selecting a number of fields for obtaining matching, wherein the number of fields is not greater than the total number of fields;

automatically identifying matching pairs of predetermined financial transactions, wherein each matching pair includes a first pair half comprising a first predetermined financial transaction for the first user, and a second pair half comprising a second predetermined financial transaction for the second user, and wherein the first pair half and the second pair half are within the selected number of fields; and the first user selecting matching pairs of predetermined financial transactions, wherein each matching pair includes a first manual match pair half comprising a first predetermined financial transaction for manual match for the first user, and a second manual match pair half comprising a second predetermined financial transaction for manual match for the second user, and wherein the first predetermined financial transaction for manual match for the first user and the second predetermined financial transaction for manual match for the second user contain the same data.

18. A method of matching a plurality of predetermined financial transactions, wherein data for the plurality of predetermined financial transactions are categorized into at least one field of a plurality of fields such that data is contained in a total number of fields, comprising:

receiving a selection of a predetermined financial transaction from a first remote terminal;

receiving a selection of a predetermined financial transaction from a second remote terminal;

receiving a selection of a number of fields for obtaining matching, wherein the number of fields is not greater than the total number of fields;

automatically identifying matching pairs of predetermined financial transactions, wherein each matching pair includes a first pair half comprising a first predetermined financial transaction from the first terminal, and a second pair half comprising a second predetermined financial transaction from the second terminal, and wherein the first pair half and the second pair half are within the selected number of fields;

automatically providing an option to one of the first and second terminals to generate a summary report; and if the option to generate the summary report is selected, automatically generating the summary report;

wherein the summary report includes at least two fields, each of the fields including a set of elements and a set of data further comprising:

receiving a selection from the at least two fields a first field containing a first set of elements and a set of data;

automatically providing an option to suggest matches for the field;

if the option to suggest matches for the field is selected, automatically searching a second set of elements for a second field; and automatically identifying a set of data for which the set of elements for the second field matches the set of data for the first field.

19. The method of claim 18, wherein the predetermined financial transactions comprise at least one transaction selected from the group of securities, foreign exchange, money markets, and derivatives.

20. The method of claim 18, wherein the plurality of predetermined financial transactions include one from the group of an order to buy an investment instrument and an order to sell an investment instrument.

21. The method of claim 18, further comprising:

initiating a communication link with the first terminal;

initiating a communication link with the second terminal; and wherein initiating a communication link with the first terminal further includes:

automatically prompting for a user identifier;

transmitting a user identifier prompt response;

automatically comparing the response to a predetermined user identifier; and if the response does not match the predetermined user identifier, automatically preventing the communication link.

22. The method of claim 18, further comprising:

requesting a display of differences between fields for the identified unmatched pairs of predetermined financial transactions; and automatically displaying differences between fields for the identified unmatched pairs of predetermined financial transactions.

23. The method of claim 18, further comprising:

selecting charges associated with the plurality of predetermined financial transactions.

24. The method of claim 23, wherein the charges consist of at least one from the group of commission, broker commission, shared commission, stamp duty, transaction tax, value added tax, withholding tax, postage, shipping, soft dollar, tax, transfer tax, payment levy, SEC fees, matching fee, local tax, and country tax.

25. The method of claim 18, wherein each of the plurality of predetermined financial transactions is conducted using a transaction currency.

26. The method of claim 18, further comprising:

selecting a base currency;

automatically comparing the transaction currency of each of the plurality of predetermined transactions to the base currency; and for each of the plurality of predetermined transactions for which the transaction currency does not match the base currency, automatically applying an exchange rate to the transaction currency.

27. The method of claim 18, further comprising:

selecting a data file to import, the data file containing data; and automatically importing data from the data file.

28. The method of claim 27, wherein the data file comprises a file in SWIFT format.

29. The method of claim 28, wherein the data file comprises a file in tab delimited format.

30. The method of claim 18, further comprising:

automatically assigning a record to the identified matching pairs of predetermined financial transactions, such that each predetermined financial transaction has an assigned record for each of the identified matching pairs of predetermined financial transactions; and automatically providing an option to view the assigned record for each of the identified matching pairs of predetermined financial transactions.

31. The method of claim 18, further comprising:

automatically presenting at the first terminal an option to select a set of fields to display, the set of fields comprising not more than the at least two fields; and if the option to select the set of fields is selected, automatically providing the first user with a group of selections corresponding to the fields comprising the set of fields; and receiving a selection from the group of selections such that the set of fields comprises fields corresponding to the group of selections.

32. The method of claim 18, further comprising:

transmitting a message to a banking institution to settle the predetermined financial transaction; and the banking institution settling the financial transaction.

33. A method of matching a plurality of predetermined financial transactions, wherein data for the plurality of predetermined financial transactions are categorized into at least one field of a plurality of fields such that data is contained in a total number of fields, comprising:

propagating a first data signal that provides a first communication link;

propagating a second data signal that provides a second communication link;

propagating a third data signal over the first communication link that indicates a first predetermined financial transaction has been selected;

propagating a fourth data signal over the second communication link that indicates a second predetermined financial transaction has been selected;

propagating a fifth data signal that identifies selected number of fields for obtaining matching, wherein the number of fields is not greater than the total number of fields;

propagating a sixth data signal based at least on the third, fourth, and fifth data signals that identifies matching pairs of predetermined financial transactions, wherein one of the identified matching pairs includes a first pair half comprising a first predetermined financial transaction, and a second pair half comprising a second predetermined financial transaction, and wherein the first pair half and the second pair half are within the selected number of fields;

propagating a seventh data signal over the first communication link that indicates a desire to generate a summary report;

propagating an eighth data signal over the first communication link that indicates the summary report;

wherein the summary report includes at least two fields, each of the fields including a set of elements and a set of data further comprising:

a first selected field from the at least two fields that contains a first set of elements and a set of data;

propagating a ninth data signal over the first communication link that indicates a desire to suggest matches for the field; and propagating a tenth data signal that identifies a set of data for which a set of elements for the second field matches the set of data for the first field, wherein the set of data is identified based on a search of the second set of elements for the second field.

34. The method of claim 33, further comprising:

propagating an eleventh data signal that indicates a desire to display a set of fields, the set of fields comprising not more than the at least two fields;

propagating a twelfth data signal that indicates a group of selections corresponding to the fields comprising the set of fields; and propagating a thirteenth data signal that indicates a selection from the group of selections such that the set of fields comprises fields corresponding to the group of selections.

35. A method of matching a plurality of predetermined financial transactions, wherein data for the plurality of predetermined financial transactions are categorized into at least one field of a plurality of fields such that data is contained in a total number of fields, comprising:

propagating a first data signal that provides a first communication link;

propagating a second data signal that provides a second communication link;

propagating a third data signal over the first communication link that indicates a first predetermined financial transaction has been selected;

propagating a fourth data signal over the second communication link that indicates a second predetermined financial transaction has been selected;

propagating a fifth data signal that identifies selected number of fields for obtaining matching, wherein the number of fields is not greater than the total number of fields;

propagating a sixth data signal based at least on the third, fourth, and fifth data signals that indicates an automatic identification of matching pairs of predetermined financial transactions, wherein one of the identified matching pairs includes a first pair half comprising a first predetermined financial transaction, and a second pair half comprising a second predetermined financial transaction, and wherein the first pair half and the second pair half are within the selected number of fields; and selecting matching pairs of predetermined financial transactions, wherein each matching pair includes a first manual match pair half comprising a first predetermined financial transaction for manual match, and a second manual match pair half comprising the second predetermined financial transaction for manual match, and wherein the first predetermined financial transaction for manual match and the second predetermined financial transaction for manual match contain the same data.

* * * * *